(12) United States Patent
Iguchi et al.

(10) Patent No.: US 9,961,231 B2
(45) Date of Patent: May 1, 2018

(54) IMAGE PROCESSING METHOD THAT ATTEMPTS DECODING OF ADDITIONAL INFORMATION USING A PLURALITY OF DECODING METHODS, AND APPARATUS THEREFOR

(71) Applicant: CANON KABUSHIKI KAISHA, Tokyo (JP)

(72) Inventors: Ryosuke Iguchi, Kawasaki (JP); Nobutaka Miyake, Yokohama (JP); Yuki Ishida, Kawasaki (JP); Wei Song, Kawasaki (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/270,268

(22) Filed: Sep. 20, 2016

(65) Prior Publication Data
US 2017/0099410 A1    Apr. 6, 2017

(30) Foreign Application Priority Data

Oct. 6, 2015 (JP) ................. 2015-198928
Oct. 6, 2015 (JP) ................. 2015-198929

(51) Int. Cl.
*H04N 1/32* (2006.01)
*H04N 1/411* (2006.01)

(52) U.S. Cl.
CPC ..... *H04N 1/32315* (2013.01); *H04N 1/32229* (2013.01); *H04N 1/32277* (2013.01); *H04N 1/32325* (2013.01); *H04N 1/4115* (2013.01); *H04N 2201/3283* (2013.01)

(58) Field of Classification Search
None
See application file for complete search history.

(56) References Cited

U.S. PATENT DOCUMENTS

| | | | |
|---|---|---|---|
| 6,801,636 B2 | 10/2004 | Murakami et al. |
| 6,959,385 B2 | 10/2005 | Murakami et al. |
| 7,035,426 B2 | 4/2006 | Nishikawa et al. |
| 7,085,232 B1 | 6/2006 | Miyake |
| 7,072,522 B2 | 7/2006 | Miyake et al. |
| 7,079,267 B2 | 7/2006 | Umeda et al. |
| 7,142,689 B2 | 11/2006 | Hayashi et al. |
| 7,171,019 B2 | 1/2007 | Miyake et al. |
| 7,231,059 B1 | 6/2007 | Miyake |
| 7,253,917 B2 | 8/2007 | Umeda et al. |
| 7,408,680 B2 | 8/2008 | Miyake et al. |

(Continued)

FOREIGN PATENT DOCUMENTS

| | | |
|---|---|---|
| JP | 3959890 B | 8/2007 |
| JP | 2012-190085 A | 10/2012 |

*Primary Examiner* — Thomas D Lee
(74) *Attorney, Agent, or Firm* — Fitzpatrick, Cella, Harper & Scinto

(57) ABSTRACT

An image processing method is provided for acquiring additional information from image information obtained by shooting a printed product on which the additional information is multiplexed by at least one of a plurality of different multiplexing methods, the method comprising: attempting decoding of the additional information from the image information by a plurality of different decoding methods corresponding to the plurality of different multiplexing methods; and outputting, by a unit, the additional information successfully decoded.

20 Claims, 31 Drawing Sheets

(56) References Cited

U.S. PATENT DOCUMENTS

| | | |
|---|---|---|
| 7,536,026 B2 | 5/2009 | Kaneda et al. |
| 8,853,736 B2 | 10/2014 | Mori |
| 2003/0210803 A1 | 11/2003 | Kaneda et al. |
| 2007/0181691 A1* | 8/2007 | Chang ............... G06F 17/30879 235/462.41 |
| 2008/0011855 A1* | 1/2008 | Nadabar ............ G06K 7/10722 235/462.07 |
| 2008/0029602 A1* | 2/2008 | Burian ............... G06K 7/10722 235/462.09 |
| 2012/0050753 A1* | 3/2012 | Rakshit ............... G06K 7/1439 358/1.9 |

\* cited by examiner

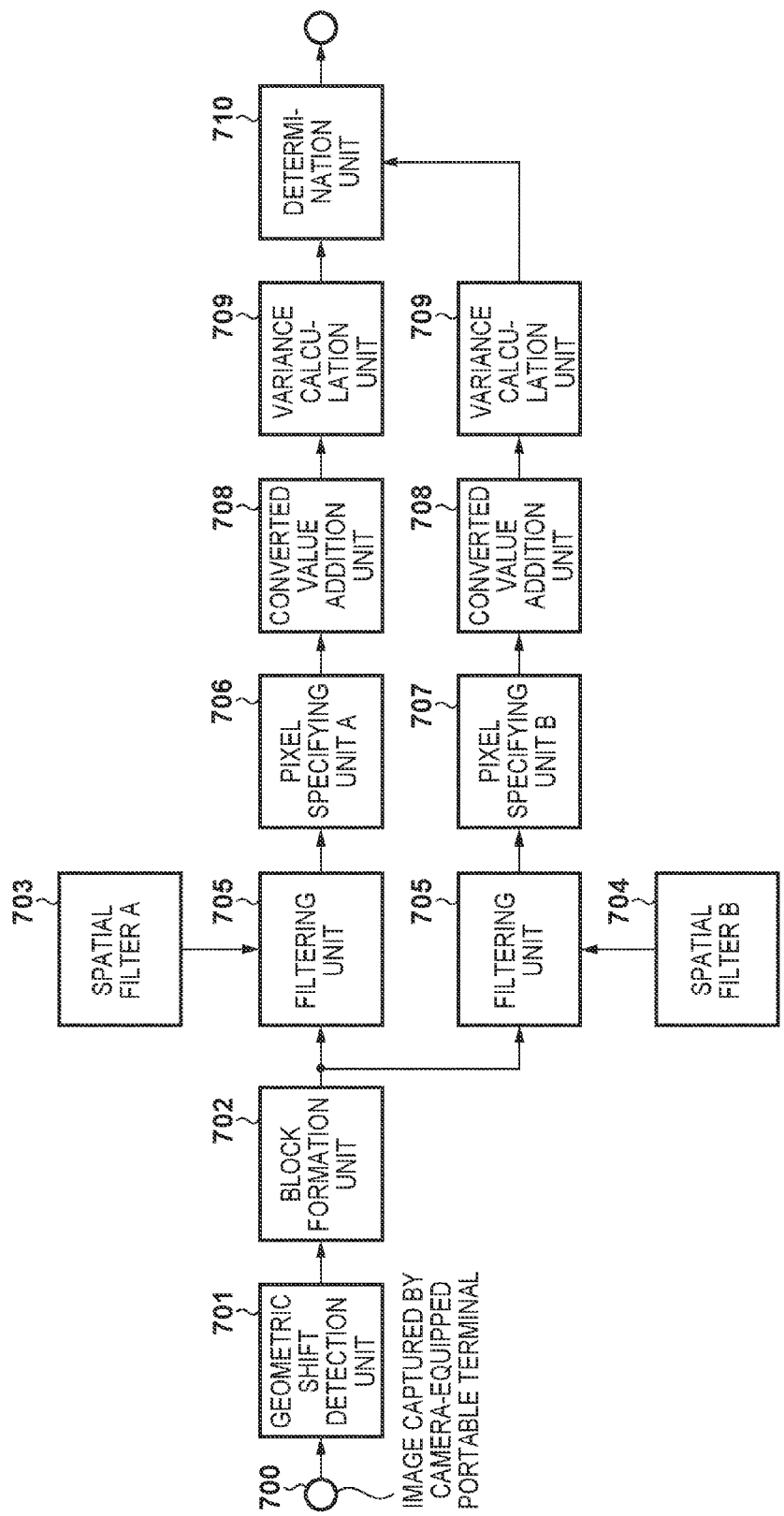

F I G. 9A

| | | | −1 | −1 |
|---|---|---|---|---|
| | −1 | −1 | 2 | 2 |
| −1 | 2 | 2 | −1 | −1 |
| 2 | −1 | −1 | | |
| −1 | | | | |

F I G. 9B

| | | −1 | 2 | −1 |
|---|---|---|---|---|
| | | −1 | 2 | −1 |
| | −1 | 2 | −1 | |
| | −1 | 2 | −1 | |
| −1 | 2 | −1 | | |

FIG. 12

| 3 | 3 | 2 | 2 | 1 | 1 | 0 | 0 | 3 | 3 | 2 | 2 | 1 | 1 | 0 | 0 |
|---|---|---|---|---|---|---|---|---|---|---|---|---|---|---|---|
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |

F I G. 13

| 3 | 2 | 1 | 0 | 3 | 2 | 1 | 0 | 3 | 2 | 1 | 0 | 3 | 2 | 1 | 0 |
|---|---|---|---|---|---|---|---|---|---|---|---|---|---|---|---|
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |
| 3 | 2 | 1 | 0 | 3 | 2 | 1 | 0 | 3 | 2 | 1 | 0 | 3 | 2 | 1 | 0 |
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |

F I G. 14
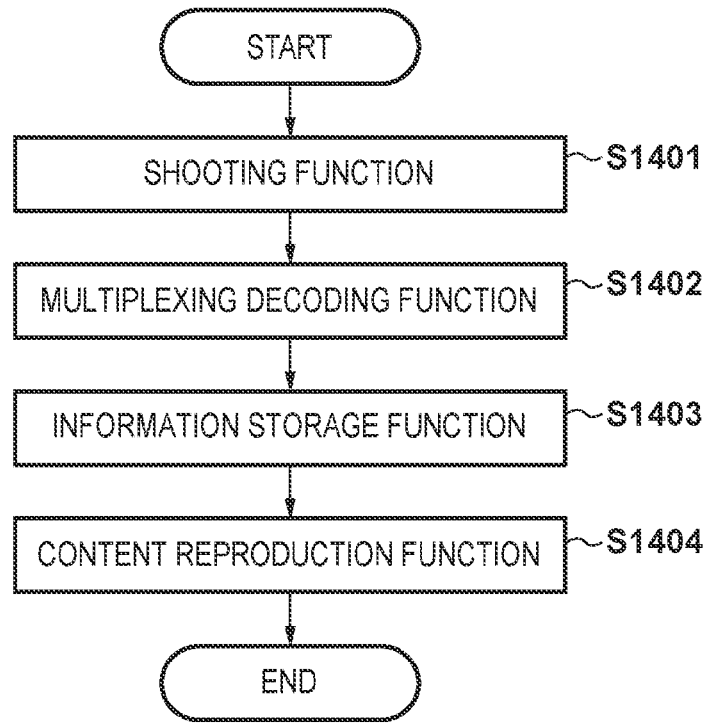
F I G. 15
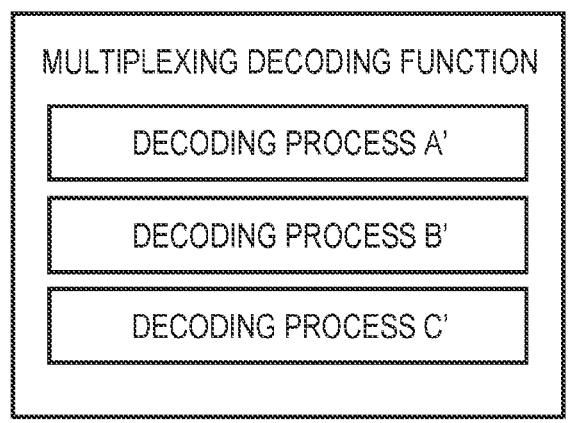

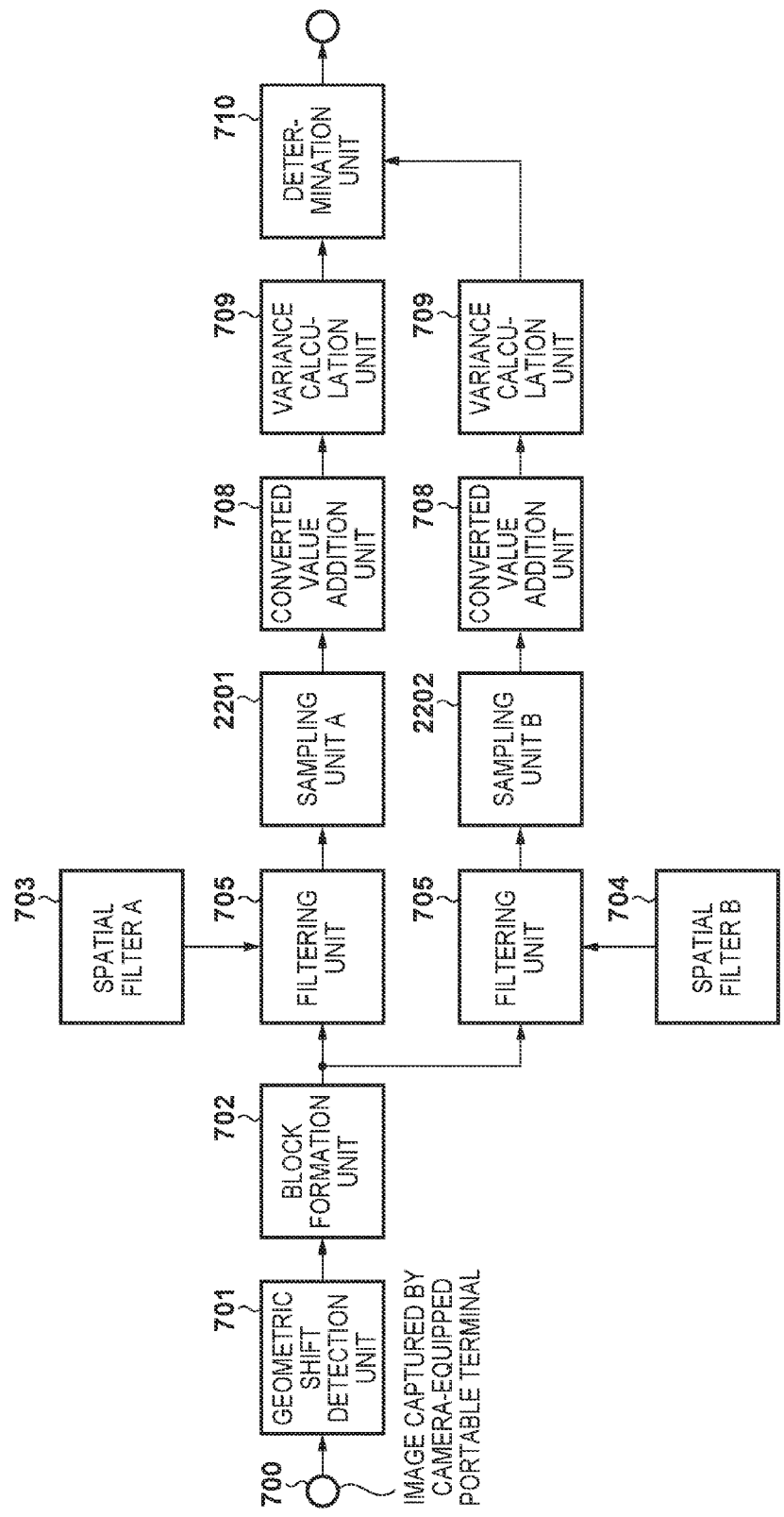

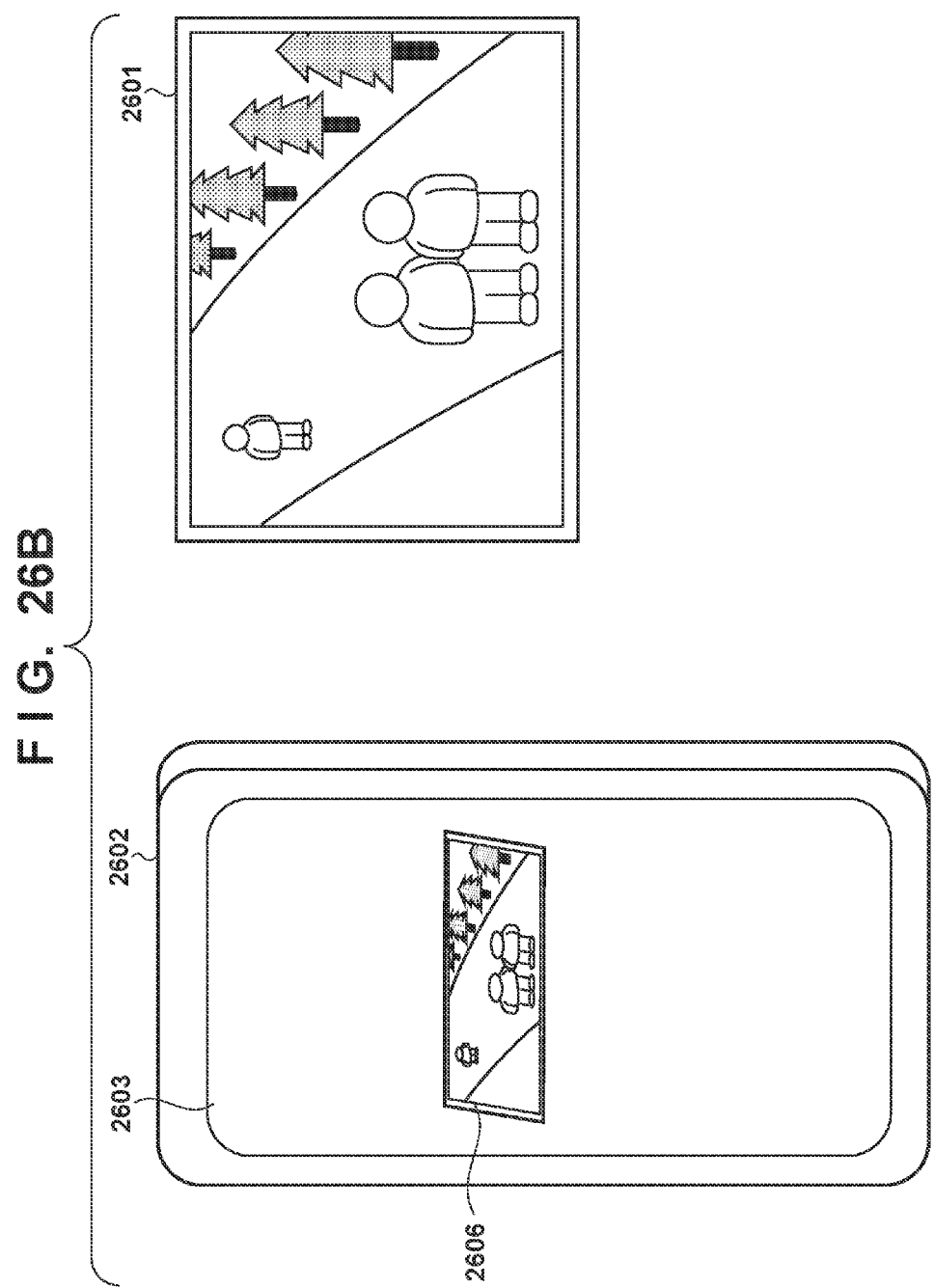

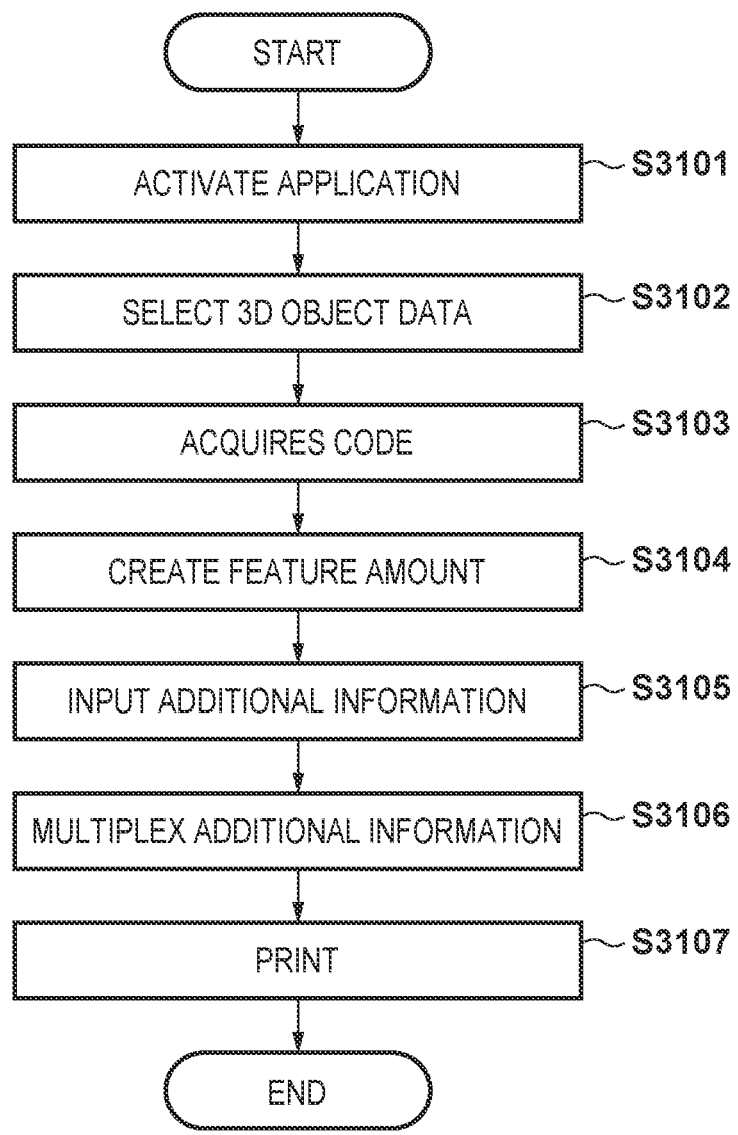

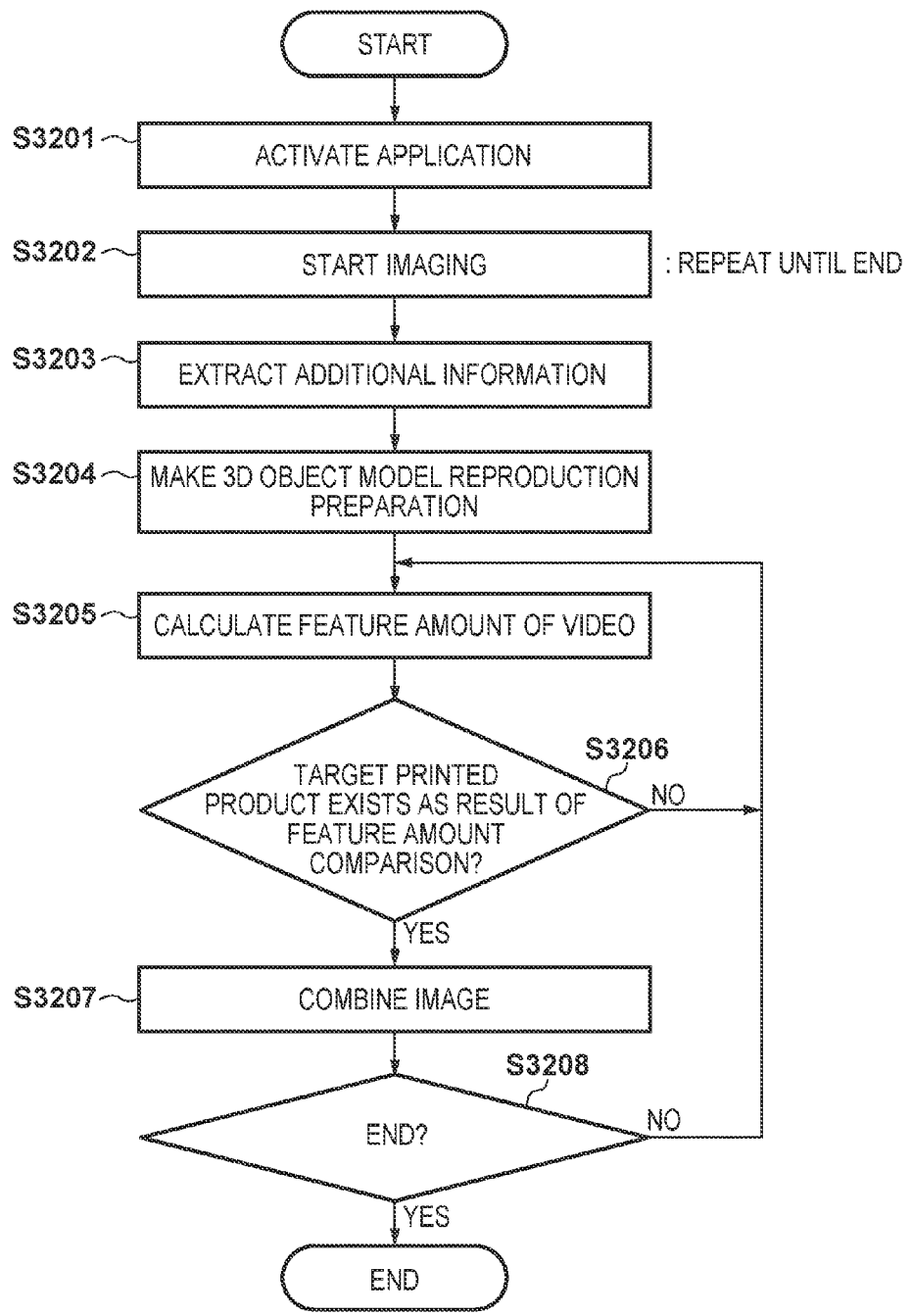

IMAGE PROCESSING METHOD THAT ATTEMPTS DECODING OF ADDITIONAL INFORMATION USING A PLURALITY OF DECODING METHODS, AND APPARATUS THEREFOR

BACKGROUND OF THE INVENTION

Field of the Invention

The present invention relates to an image processing method and apparatus and, more particularly, to image processing of reading out, by an imaging medium, additional information from a printed product in which information other than image information, for example, voice information, text information, and completely different image information such as pieces of information about an image are visually unnoticeably embedded as additional information in the image information.

Description of the Related Art

Conventionally, extensive studies have been made on multiplexing information associated with an image on image information. Recently, a technique called a digital watermark technique has been standardized, which multiplexes additional information such as an author name and user permission/inhibition on the image information of a photograph, a painting, or the like such that the additional information is difficult to visually discriminate, and distributes the image information via a network such as the Internet. As another application field, there is a technique of embedding additional information in an image in order to specify an output device and its device number from an image output on paper, in order to prevent forgery of a paper money, stamp, securities, and the like along with the improvement of the image qualities of image output apparatuses such as a copying machine and printer. For example, Japanese Patent No. 3959890 proposes a technique of, when embedding a digital watermark in a printed product, embedding a pattern whose color or brightness is changed in accordance with the type or properties of the printed product in an arbitrary type of digital watermark method, thereby making the pattern unnoticeable.

In Japanese Patent No. 3959890, there are a plurality of different information adding methods, and the pattern is embedded in the printed product by one of the methods. In this case, if a multiplexing method such as the digital watermark technique that is invisible to a user is used, the user cannot know a decoding method to be used for processing to acquire the information from the printed product, and needs time to try the methods one by one.

SUMMARY OF THE INVENTION

The present invention provides an image processing apparatus that allows a user to acquire embedded information without making cumbersome settings in a case in which a plurality of methods are usable as multiplexing methods of embedding information in image data, a decoding method for information multiplexed in an image, and a program.

The present invention has the following arrangement.

According to an aspect of the present invention, there is provided an image processing method of acquiring additional information from image information obtained by shooting a printed product on which the additional information is multiplexed by at least one of a plurality of different multiplexing methods, comprising: attempting decoding of the additional information from the image information by a plurality of different decoding methods corresponding to the plurality of different multiplexing methods; and outputting, by a unit, the additional information successfully decoded.

According to the present invention, the user can acquire embedded information from a printed product without making cumbersome settings even if the information is embedded in image data by a plurality of different methods.

Further features of the present invention will become apparent from the following description of exemplary embodiments with reference to the attached drawings.

BRIEF DESCRIPTION OF THE DRAWINGS

FIG. 7 is a block diagram showing the main part of the additional information demultiplexing unit in which a periodicity is added to RGB brightness information;

FIGS. 9A and 9B are views showing examples of spatial filters;

FIG. 12 is a view showing an example of a pixel specifying method;

FIG. 13 is a view showing an example of a pixel specifying method;

FIG. 14 is a flowchart until contents are reproduced from a shot image;

FIG. 15 is a view showing a plurality of different decoding processes stored in a multiplexing decoding function shown in FIG. 14;

FIG. 22 is a block diagram showing the arrangement of an additional information demultiplexing unit;

FIG. 26B is a view for explaining effect image processing using the AR technology;

FIG. 31 is a flowchart showing generation processing of a printed product on which information is multiplexed;

FIG. 32 is a flowchart showing reading processing of a printed product on which information is multiplexed;

DESCRIPTION OF THE EMBODIMENTS

Preferred embodiments of the present invention will now be described in detail with reference to the accompanying drawings. Note that an image processing apparatus according to the embodiments includes an additional information multiplexing unit that embeds additional information in a printed product, and an additional information demultiplexing unit that reads the additional information from the printed product. It is efficient to incorporate the additional information multiplexing unit as printer driver software or application software in a computer that creates image information to be output to a printer engine. However, it is also effective to incorporate the additional information multiplexing unit as hardware and software in a copying machine, facsimile apparatus, printer main body, or the like. Examples of the additional information demultiplexing unit are a camera-equipped mobile phone, a camera-equipped smartphone, and a tablet PC. Such an imaging device will be referred to as a camera-equipped portable terminal hereinafter. On the other hand, the additional information demultiplexing unit may be, for example, a series of units that demultiplex additional information by application software in a computer from an image shot by a digital still camera. A terminal is an information processing apparatus such as a computer. Hence, a procedure to be described in the embodiments is an image processing method or an information processing method executed by the information processing apparatus. The camera of the camera-equipped mobile phone may be an external camera. Note that terms "print" and "printed product" are used in the embodiments and the like. However, a printed object is not limited to a character. The terms "print" and "printed product" are usable even for other objects including a photograph and a line drawing and can be replaced with "output" and "output product".

First Embodiment

Figure 1A:
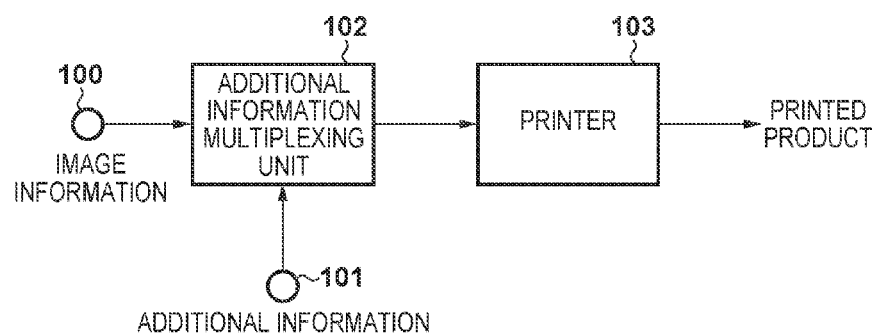
FIGS. 1A and 1B are block diagrams showing the arrangements of an additional information multiplexing unit and an additional information demultiplexing unit according to an embodiment.
Figure 1B:
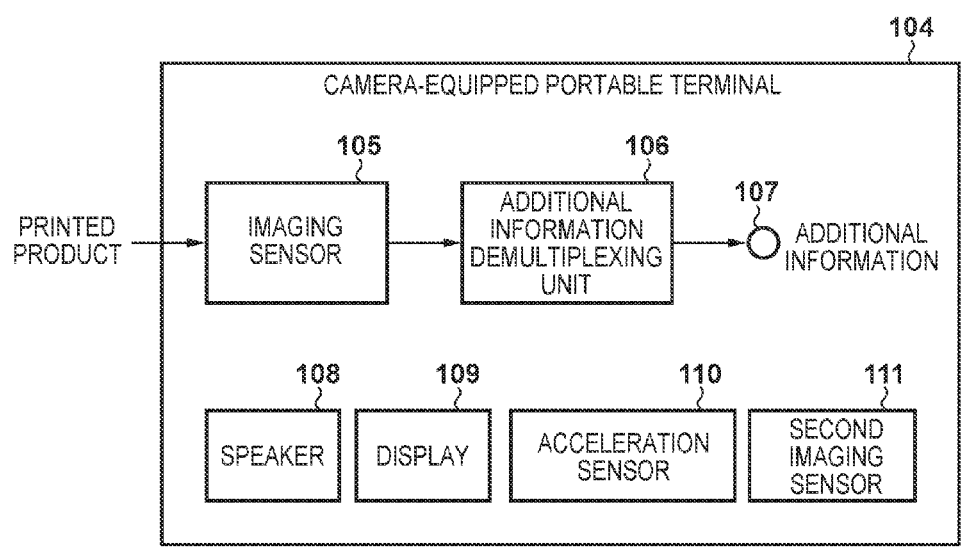

FIGS. 1A and 1B are block diagrams showing the arrangement of an image processing system according to the first embodiment of the present invention.

In FIG. 1A, multi-tone image information is input from an input terminal 100, and necessary additional information to be embedded in the image information is input from an input terminal 101. The additional information is considered to be variously applied as information other than the image information input from the input terminal 100, for example, voice information, moving image information, text information, pieces of information such as the copyright, shooting date/time, shooting location, and user regarding an image input from the input terminal 100, and completely different image information.

An additional information multiplexing unit 102 is a unit that embeds additional information in image information such that the additional information is difficult to visually discriminate. The additional information multiplexing unit 102 also executes quantization processing of input multi-tone image information as well as multiplexing of the additional information.

A printer 103 causes a printer engine to visualize, on a medium, information created by the additional information multiplexing unit, and outputs it as a printed product. The printer 103 is assumed to be a printer that implements a halftoning expression using pseudo-halftoning, for example, an inkjet printer or a laser printer.

An imaging sensor 105 of a camera-equipped portable terminal 104 shown in FIG. 1B reads the image on the output printed product. An additional information demultiplexing unit 106 demultiplexes the additional information embedded in the image printed on the printed product and outputs the demultiplexed additional information to an output terminal 107. The output terminal 107 is an interface that outputs the acquired additional information. For example, voice information is output to a speaker 108 of the camera-equipped portable terminal 104, and image information is output to a display 109. The output terminal 107 may be an interface that outputs data to an external device. If the camera-equipped portable terminal 104 includes a plurality of imaging sensors, the printed product may be shot by a second imaging sensor 111.

<Arrangement of Additional Information Multiplexing Unit 102>

Figure 2:
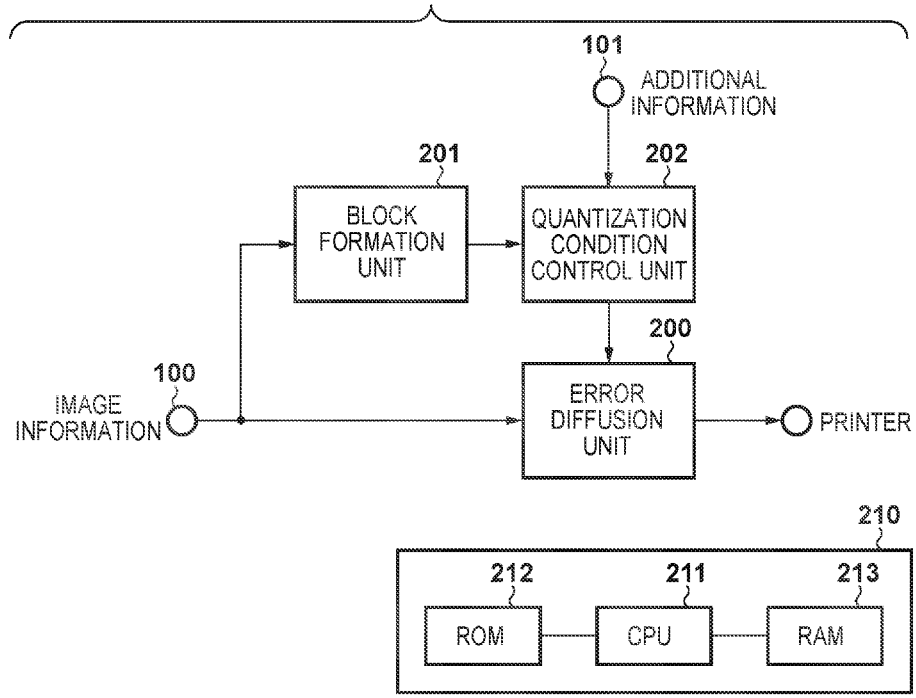
FIG. 2 is a block diagram showing the main part of the additional information multiplexing unit shown in FIG. 1A.

FIG. 2 is a block diagram showing the arrangement of the additional information multiplexing unit 102 shown in FIG. 1A. Note that an example of the embodiment will be described below, and a method of embedding information is not limited to a method to be explained below. Printing will be described. However, the present invention is not limited to this, and the same effect can be obtained even by an arrangement that embeds multiplexed information in RGB image data and displays it on a display.

An error diffusion unit 200 performs pseudo-halftoning using an error diffusion method, thereby converting image information input from the input terminal 100 into a quantization level lower than the number of input tones, thereby a really expressing the tonality based on the quantized values of a plurality of pixels. Details of error diffusion processing will be described later.

A block formation unit 201 segments input image information into predetermined regions. Block formation performed by the block formation unit 201 may be segmentation into rectangles or regions other than rectangles.

A quantization condition control unit 202 changes and controls a quantization condition for each block region formed by the block formation unit 201. The quantization condition control unit 202 controls the quantization condition for each block based on additional information input from the input terminal 101. The quantization condition controlled by the quantization condition control unit 202 and output includes, for example, a quantization threshold. In binarization, one quantization threshold is used. In multi-valuing, thresholds in a number according to the number of tones after quantization are output. The number of tones may be included in the quantization condition.

A control unit 210 includes a CPU 211, a ROM 212, a RAM 213, and the like. The CPU 211 executes a control program held in the ROM 212 and controls the operations and processing of the above-described components, for example, the error diffusion unit 200 and the quantization condition control unit 202. The RAM 213 is used as the work area of the CPU 211. The above-described blocks may be hardware controlled by the control unit 210 or logical functional blocks implemented by program execution by the control unit 210.

<Arrangement of Error Diffusion Unit 200>

Figure 3:
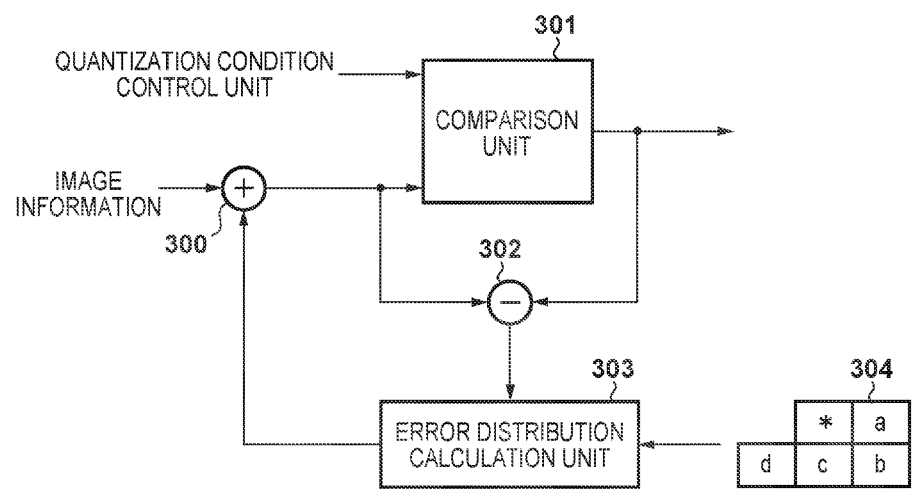
FIG. 3 is a block diagram showing details of a quantization unit.

FIG. 3 is a block diagram showing details of the error diffusion unit 200. Error diffusion processing in which the quantized value is binary will be exemplified.

An adder 300 adds the value of a pixel of interest of input image information and the distributed quantization error of an already binarized peripheral pixel. A comparison unit 301 compares a quantization threshold from the quantization condition control unit 202 and the pixel value with the error added by the adder 300. If the pixel value is larger than the quantization threshold, the comparison unit 301 outputs "1". Otherwise, "0" is output. For example, when expressing pixel tonality at 8-bit accuracy, it is generally expressed by a maximum value "255" and a minimum value "0".

Assume that a dot (for example, ink or toner) is printed on paper when the quantized value is "1" (that is, 255). A subtracter 302 calculates an error between the quantization result and the above-described addition result of the value of the pixel of interest and the distributed error. Based on an error distribution calculation unit 303, the error is distributed to the peripheral pixels that undergo subsequent quantization processing. As for the error distribution ratio, a distribution table 304 of errors experimentally set based on the relative distances between a pixel of interest and peripheral pixels is held in advance. The error distribution calculation unit 303 distributes the quantization error obtained by the subtracter 302 based on the distribution ratio described in the distribution table 304. The distribution table 304 shown in FIG. 3 is a distribution table for four unquantized pixels out of the eight pixels around the pixel of interest, but is not limited to this.

<Processing Procedure by Quantization Condition Control Unit and Error Diffusion Unit>

The operation procedure of overall processing including the quantization condition control unit 202 will be described next with reference to the flowchart of FIG. 4. An example in which the quantized value is binary will be described.

In step S401, the control unit 210 initializes a variable i. The variable i counts the vertical address of a processing target pixel, that is, a pixel of interest.

In step S402, the control unit 210 initializes a variable j. The variable j counts the horizontal address of the pixel of interest.

Step S403 is a determination step using the address values i and j. The control unit 210 determines whether the coordinates (i, j) representing the address of the current pixel of interest belong to a region where multiplexing processing should be executed.

Figure 5:
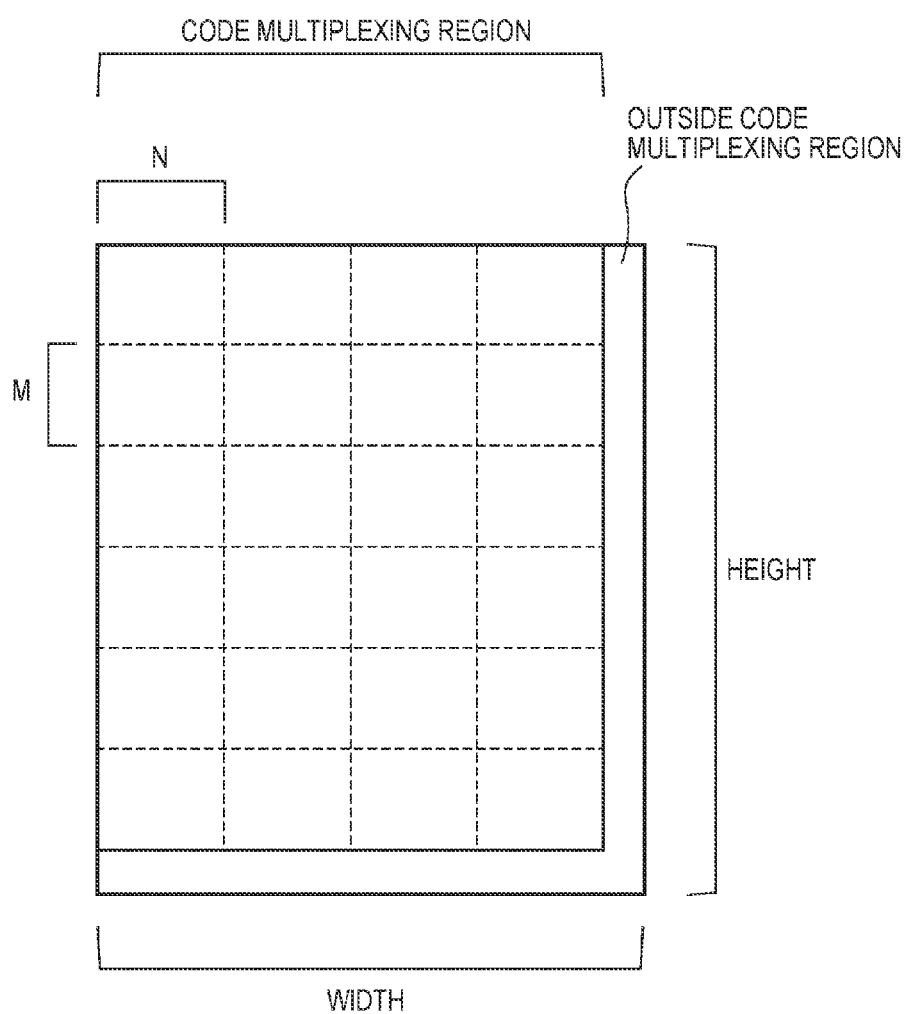
FIG. 5 is a view showing a digital watermark superimposition region on a paper sheet.

A multiplexing region will be described with reference to FIG. 5. FIG. 5 illustrates one image in which the horizontal pixel count is WIDTH and the vertical pixel count is HEIGHT. Assume that additional information is multiplexed on this image. The upper left corner of the image is defined as an origin, and the image is segmented into blocks each including N pixels in the horizontal direction×M pixels in the vertical direction. In this embodiment, block formation is performed using the origin as a reference point. However, a point spaced apart from the origin may be set as a reference point. When multiplexing maximum information on this image, blocks each including N×M pixels are arranged from the reference point. That is, letting W be the number of blocks that can be arranged in the horizontal direction, and H be the number of blocks that can be arranged in the vertical direction, the following relations are obtained.

$$W=\text{INT}(\text{WIDTH}/N) \quad (1)$$

$$H=\text{INT}(\text{HEIGHT}/M) \quad (2)$$

where INT( ) is the integer part of the value in H.

The remainder numbers of pixels indivisible in equations (1) and (2) are equivalent to an end portion when the blocks each including N×M pixels are arranged. The end portion is located outside the region where additional information is multiplexed, that is, outside the code multiplexing region. In step S403 of FIG. 4, if the pixel of interest is located in a rectangular region with W×N pixels in the horizontal direction×H×M pixels in the vertical direction, it is determined that the pixel of interest is located in the code multiplexing region. Otherwise, it is determined that the pixel of interest is located outside the code multiplexing region. N and M represent the size of a block formed by the block formation unit 201, and WIDTH and HEIGHT represent the size of image data to be processed.

Figure 4:
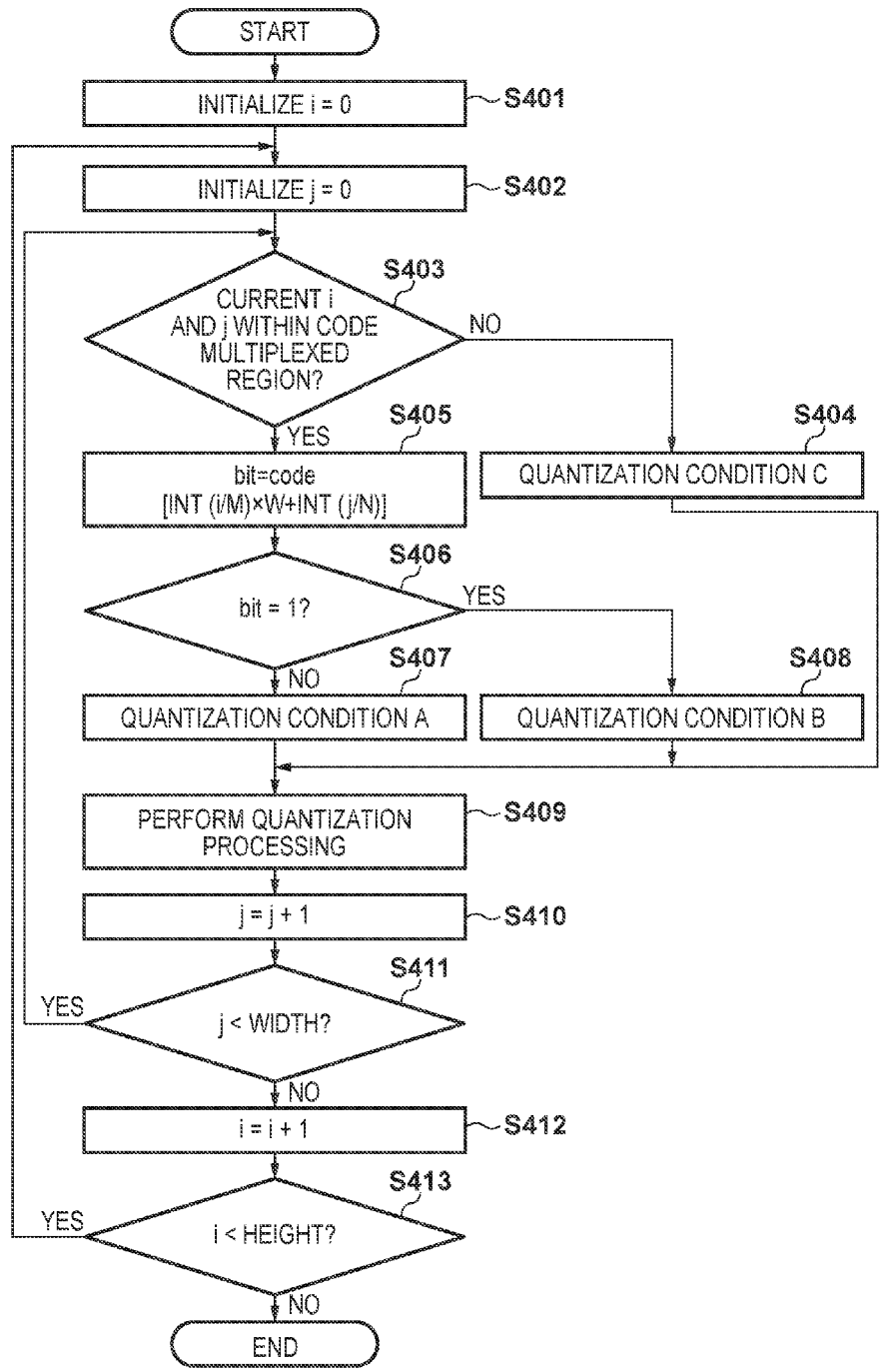
FIG. 4 is a flowchart showing the operation procedure of printed product creation.

Upon determining that the pixel of interest currently under processing is located outside the multiplexing region in step S403 of FIG. 4, the control unit 210 sets a quantization condition C in step S404. In contrast, upon determining that the pixel of interest is located in the multiplexing region, in step S405, the control unit 210 loads additional information to be multiplexed. For descriptive convenience, assume that the additional information is expressed bit by bit using an array code[ ]. For example, assuming that the additional information is 48-bit information, the array code[ ] stores respective bits in code[0] to code [47]. In step S405, information in the array code[ ] is substituted into a variable bit as follows.

$$\text{bit}=\text{code}[\text{INT}(i/M)\times W+\text{INT}(j/N)] \quad (3)$$

where the index on the right-hand side of equation (3) represents the order of a block arranged in the raster order. By equation (3), each bit of the additional information is associated with each block of the image data to be processed. Hence, the number of bits of the additional information code is equal to or less than W×H, and is preferably equal to W×H. For example, in FIG. 5, the number of blocks is 4×6=24. When the code has 48 bits, the image data is preferably segmented into, for example, 8×6=48 blocks.

Subsequently, in step S406, the control unit 210 determines whether the variable bit substituted in step S405 is "1". As described above, since information in the array code[ ] is stored bit by bit for each array element, the value of the variable bit also indicates either "0" or "1".

Upon determining in step S406 that the value of the variable bit is "0", the control unit 210 sets a quantization condition A in step S407. Upon determining that the value of the variable bit is "1", the control unit 210 sets a quantization condition B in step S408. In step S409, the control unit 210 performs quantization processing based on the set quantization condition. This processing may be done by the error diffusion unit 200. The quantization processing corresponds to the error diffusion method described with reference to FIG. 3.

In step S410, the variable j in the horizontal direction is incremented by one. In step S411, it is determined whether the variable j is smaller than the horizontal pixel count WIDTH. The above-described processing is repeated until the number of processed pixels reaches WIDTH. When the processing in the horizontal direction is performed as many times as the horizontal pixel count WIDTH, in step S412, the variable i in the vertical direction is incremented by one. In step S413, it is determined whether the variable i is smaller than the vertical pixel count HEIGHT. The above-described processing is repeated until the number of processed pixels reaches HEIGHT.

With the above-described operation procedure, the quantization condition can be changed in accordance with additional information for each block including N×M pixels.

<Quantization Condition>

An example of the quantization conditions A, B, and C will be described next. The quantization condition in the error diffusion method has various factors. In the first embodiment, the quantization condition is a quantization threshold. When the quantization condition C is selected, any value is usable as the quantization threshold because the pixel of interest is located outside the multiplexing region. As described above, when the tone of one pixel is expressed by 8 bits, and the quantization level is binary, the maximum value "255" and the minimum value "0" are quantization representative values. An intermediate value "128" is often set as the quantization threshold. That is, the quantization condition C is a condition that the quantization threshold is fixed to "128". When the quantization condition A or B is used, it is necessary to make a difference in image quality depending on the quantization condition because the pixel of interest belongs to a block in the multiplexing region. However, the difference in image quality needs to be expressed such that it can hardly be discriminated to vision but can easily be identified on paper.

Figure 6A:
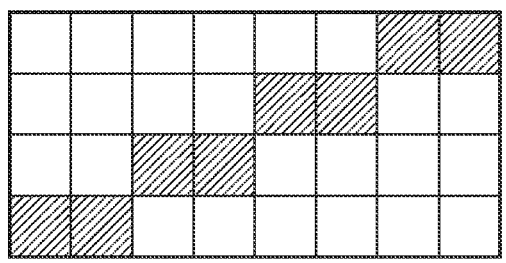
FIGS. 6A and 6B are views for explaining the period of a change in a quantization threshold.
Figure 6B:
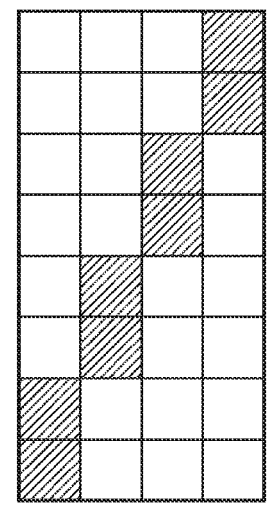

FIGS. 6A and 6B show an example of the quantization conditions A and B. FIG. 6A is a view showing the period of a change of the quantization threshold in the quantization condition A. In FIG. 6A, one square indicates one pixel, a white square indicates a fixed threshold, and a hatched square indicates a variable threshold. That is, in the example of FIG. 6A, a matrix of eight pixels in the horizontal direction and four pixels in the vertical direction is formed. An excessive value is set as a threshold only for a hatched square. FIG. 6B is a view showing the period of a change of the quantization threshold in the quantization condition B. In the example of FIG. 6B, a matrix of four pixels in the horizontal direction and eight pixels in the vertical direction is formed, unlike FIG. 6A. An excessive value is set as a threshold only for a hatched square.

As described above, when one pixel is expressed by an 8-bit tone value, for example, "128" is set as the fixed threshold, and "10" is set as the excessive threshold. When the quantization threshold lowers, the quantized value of a pixel of interest readily becomes "1" (quantization representative value "255"). That is, in both FIGS. 6A and 6B, the quantized values "1" easily line up in the arrangement of hatched squares. In other words, blocks in which dots are generated in the arrangement of hatched squares in FIG. 6A, and blocks in which dots are generated in the arrangement of hatched squares in FIG. 6B coexist for every block of N×M pixels.

In the error diffusion method, a small change of the quantization threshold does not greatly affect the image quality. In the ordered dither method, the image quality of tone expression greatly depends on a dither pattern to be used. However, in the error diffusion method that periodically gives a change of the quantization threshold, as described above, the tone expression that determines the image quality is only the error diffusion method. For this reason, even if the dot arrangement changes a little or texture generation changes, it hardly affects the image quality of tone expression. This is because even if the quantization threshold changes, an error that is the difference between a signal value and a quantized value is diffused to the peripheral pixels, and the input signal value is saved macroscopically. That is, redundancy is very large concerning the dot arrangement and texture generation in the error diffusion method. In a case of image data, quantization is performed for each color component in accordance with the above-described procedure.

In the above description, multiplexing is implemented by superimposing a predetermined periodic component (or periodicity) representing a code on a quantization threshold of the error diffusion method. However, the following methods are also conceivable:

a method of directly superimposing a periodicity on brightness information of R, G, and B a method of dividing brightness information of R, G, and B into brightness-color difference information (for example, Y, Cr, and Cb signals) and multiplexing a periodicity a method of dividing brightness information of R, G, and B into ink colors (for example, C, M, Y, and K signals) and multiplexing a periodicity Periodicity multiplexing may be done using a quantization threshold, as described above.

If input image information is white (represented by 8-bit RGB signal values R=255, G=255, and B=255), black (0, 0, 0), RED (255, 0, 0), GREEN (0, 255, 0), or BLUE (0, 0, 255), the above-described method may be unable to add or subtract a color material or may attain a little effect on the surface of a color gamut or a portion close to it. For example, normally, to express white on a printed product, the white color of a paper sheet itself is used, and no color material is used. In this case, color material subtraction is impossible. To cope with such a case, processing of reducing the dynamic range of the color gamut of an image may be inserted before multiplexing processing. Reducing the dynamic range means, for example, making a white color (255, 255, 255) a little darker (for example, 250, 250, 250) or making a black color (0, 0, 0) a little lighter (for example, 5, 5, 5) to do adjustment for attaining, for example, a uniform range. Alternatively, for example, the saturation of RED is slightly lowered (250, 0, 0) to make the color gamut a little smaller. Preferably, a device configured to perform reading processing (to be described later) is allowed to discriminate the difference, but human eyes can hardly grasp the influence of color gamut reduction. When the color gamut is allowed to increase/decrease, a color material can be added or subtracted even near the surface of the color gamut.

<Arrangement of Additional Information Demultiplexing Unit>

The additional information demultiplexing unit 106 in the image processing system shown in FIG. 1B will be described next. FIG. 7 is a block diagram showing the arrangement of the additional information demultiplexing unit 106. For descriptive convenience, an example in which additional information is demultiplexed from a printed product on which the additional information is multiplexed bit by bit for each divided block will be described, as in the example of the above-described additional information multiplexing unit 102. Needless to say, the additional information amount per block in the multiplexing unit equals the demultiplexing information amount per block in the demultiplexing unit.

Image information read by the camera-equipped portable terminal 104 is input from an input terminal 700. The resolution of the imaging sensor of the camera-equipped portable terminal 104 to be used is preferably equal to or higher than the resolution of a printer that creates a printed product. To correctly read scattering information of dots on a printed product, the resolution on the imaging sensor side needs to be at least twice higher than that on the printer side according to the sampling theorem, as a matter of course. However, if the resolution is equal or higher, scattering of dots can be determined to some extent though it may be inaccurate. Hence, in the first embodiment, the resolution of the printer and that of the imaging sensor are assumed to be equal for descriptive convenience.

A geometric shift detection unit 701 detects a geometric shift of an image shot by the camera-equipped portable terminal 104. Since the processing target image has undergone printer output and shooting by the camera-equipped portable terminal 104, the image information input from the input terminal 700 may greatly geometrically shift from the image information before printer output. Hence, the geometric shift detection unit 701 detects the boundary between the printed product and a region other than the printed product by edge detection.

Figure 8:
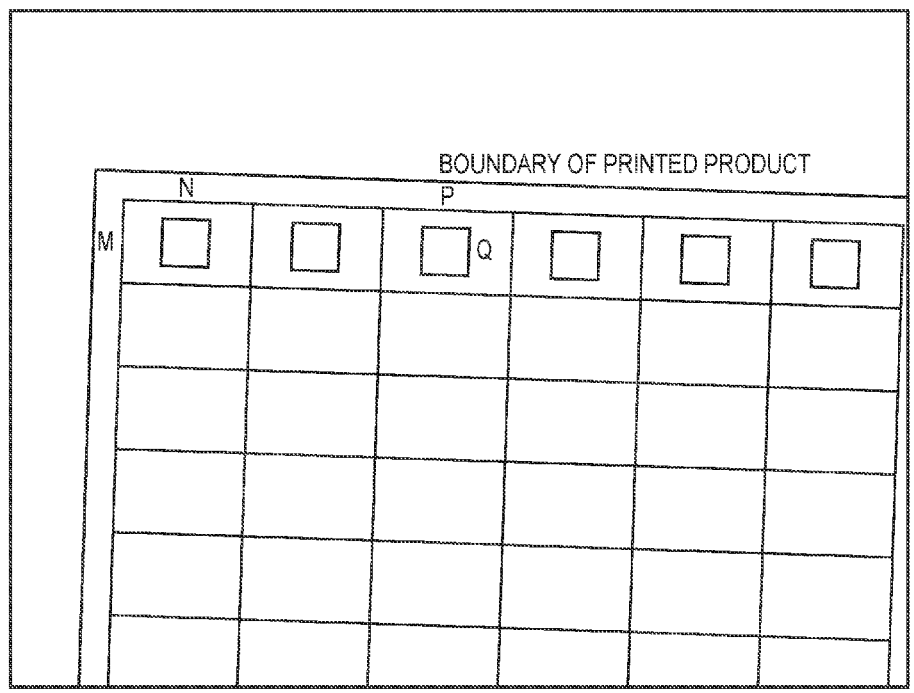
FIG. 8 is a view for explaining inclination of an image in a shot image.

FIG. 8 is a view showing a shot image input from the input terminal 700. If the printer resolution and the imaging sensor resolution are equal, a large factor to be corrected is the rotation (tilt) of an image caused by, for example, a skew during printing on paper by the printer or a shift that occurs when the camera-equipped portable terminal 104 is held over the printed product. Hence, by detecting the boundary of the printed product, the degree and direction of rotation in which the shift occurs can be determined. The shift amount can be represented by, for example, the number of pixels shifted in the vertical direction with respect to a predetermined number of pixels in the horizontal direction.

A block formation unit 702 segments the image information into blocks each including P pixels in the horizontal direction×Q pixels in the vertical direction. This block needs to be smaller than a block of N×M pixels at the time of superimposing a digital watermark. That is, $$P \leq N \text{ and } Q \leq M \quad (4)$$

hold.

Block formation of every P×Q pixels is performed at a predetermined interval. That is, block formation is performed such that one block of P×Q pixels is included in a region assumed to be a block of N×M pixels at the time of multiplexing. That is, the pitch of blocks is based on N pixels in the horizontal direction and M pixels in the vertical direction. In this case, the gaps between the blocks correspond to (N−P) pixels in the horizontal direction and (M−Q) pixels in the vertical direction. However, a shift exists between the original image and the captured image, as described above. Hence, the shift amount detected by the geometric shift detection unit 701 needs to be converted into a shift amount per block and added to the number of skipped pixels to do correction. For example, when determining a P×Q block on the right side of a certain P×Q block, the P×Q block is not determined by simply setting N pixels to the pitch in the horizontal direction. Instead, a shift in the vertical direction in a case in which the block is moved by N pixels rightward is obtained from the detected shift amount, and the P×Q block is ensured based on a position shifted by the number of pixels in the vertical direction.

Spatial filters 703 and 704 have different characteristics. Each filtering unit 705 performs digital filtering of calculating the sum of products for the peripheral pixels. The coefficients of the spatial filters 703 and 704 are created adaptively to the period of the variable threshold of the quantization condition at the time of multiplexing. Assume that the multiplexing unit 102 multiplexes additional information on image data using the two types of quantization thresholds shown in FIGS. 6A and 6B in accordance with the value of the additional information. FIGS. 9A and 9B show examples of the spatial filter A 703 and the spatial filter B 704 used by the demultiplexing unit 106 at that time. In FIGS. 9A and 9B, the center of 5×5 pixels is a pixel of interest, and the remaining 24 pixels are peripheral pixels. The pixel of each blank portion in FIGS. 9A and 9B represents that the filter coefficient is "0". As is apparent, FIGS. 9A and 9B show edge enhancement filters. In addition, the directionality of the edge to be enhanced matches the directionality of the variable threshold used in multiplexing (more specifically, the directionality in which black pixels readily line up). That is, the coefficients are created such that FIG. 9A matches FIG. 6A, and FIG. 9B matches FIG. 6B.

Pixel specifying units 706 and 707 perform processing of specifying a pixel position based on certain regularity concerning a signal (to be referred to as a converted value hereinafter) after filtering in a block of P×Q pixels. In the first embodiment, the regularity of a pixel position to be specified is divided into a periodicity and a phase and processed. That is, the pixel specifying units 706 and 707 specify pixel positions in different periodicities, and execute a plurality of pixel position specifying processes while changing the phase. The pixel position specifying method will be described later.

Converted value addition units 708 add the converted values of pixel positions specified by the pixel specifying units 706 and 707 for each phase. The pixel position specifying processing and the converted value addition processing correspond to extracting power of a predetermined frequency vector enhanced by the spatial filters 703 and 704. A frequency vector is a set of frequency components in the horizontal and vertical directions of an image, and represents the two-dimensional frequency characteristic of the image.

Variance calculation units 709 calculate the variances of a plurality of values added for the respective phases in the respective periodicities.

A determination unit 710 determines a multiplexed code based on the variances in the respective periodicities.

Figure 10:
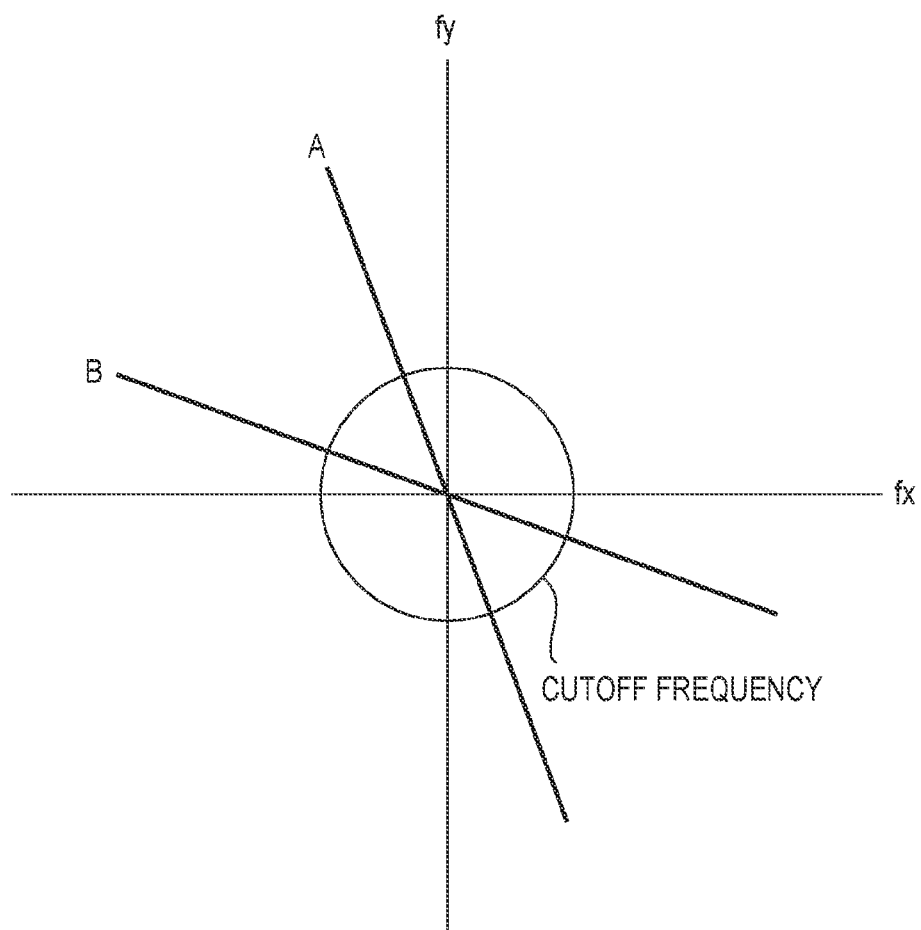
FIG. 10 is a view for explaining a frequency domain.

FIG. 10 is a view showing an outline of the first embodiment in a two-dimensional frequency domain. The abscissa represents the frequency in the horizontal direction, and the ordinate represents the frequency in the vertical direction. The origin at the center indicates a DC component. The frequency rises as it moves apart from the origin. A circle in FIG. 10 indicates a cutoff frequency by error diffusion. The filter characteristic of the error diffusion method represents the characteristic of an HPF (High Pass Filter) that cuts off a low-frequency region. The frequency to be cut off changes in accordance with the density of a target image. When the quantization threshold changes, a frequency characteristic generated after quantization changes. In an image quantized using the quantization threshold shown in FIG. 6A, a large power spectrum is generated in a frequency vector on a line A in FIG. 10. In an image quantized using the quantization threshold shown in FIG. 6B, a large power spectrum is generated in a frequency vector on a line B in FIG. 10. That is, when "128" is set as a threshold in each white portion of the threshold matrix in FIG. 6A, and "10" is set as a threshold in each hatched portion, the hatched portions readily become black pixels. Hence, in an image quantized using the threshold matrix, probably, a frequency characteristic having a period of an integer multiple of four pixels readily appears in the vertical direction, and a frequency characteristic having a period of an integer multiple of eight pixels, that is, a reciprocal readily appears in the horizontal direction. That is, a power spectrum of a frequency vector in which the frequency in the vertical direction is almost twice higher than the frequency in the horizontal direction is detected from the image quantized using the threshold matrix shown in FIG. 6A. In FIG. 6B, the horizontal direction and the vertical direction replace each other as compared to FIG. 6A. When demultiplexing additional information, detection of a frequency vector on which a large power spectrum is generated leads to determination of a multiplexed signal. It is therefore necessary to individually enhance and extract frequency vectors.

The spatial filters shown in FIGS. 9A and 9B correspond to HPFs each having the directionality of a specific frequency vector. That is, the spatial filter shown in FIG. 9A can enhance the frequency vector on the line A in FIG. 10, and the spatial filter shown in FIG. 9B can enhance the frequency vector on the line B in FIG. 10. For example, assume that a large power spectrum is generated on the frequency vector on the line A in FIG. 10 by applying the quantization condition shown in FIG. 6A. At this time, the power spectrum on the line A is amplified by the spatial filter shown in FIG. 9A but is hardly amplified by the spatial filter shown in FIG. 9B. That is, when a plurality of spatial filters perform filtering in parallel, the power spectrum is amplified only by a spatial filter coincident with the frequency vector, and is hardly amplified by other filters. Thus, a frequency vector on which a large power spectrum is generated can easily be known.

<Processing Procedure by Additional Information Demultiplexing Unit 106>

Figure 11:
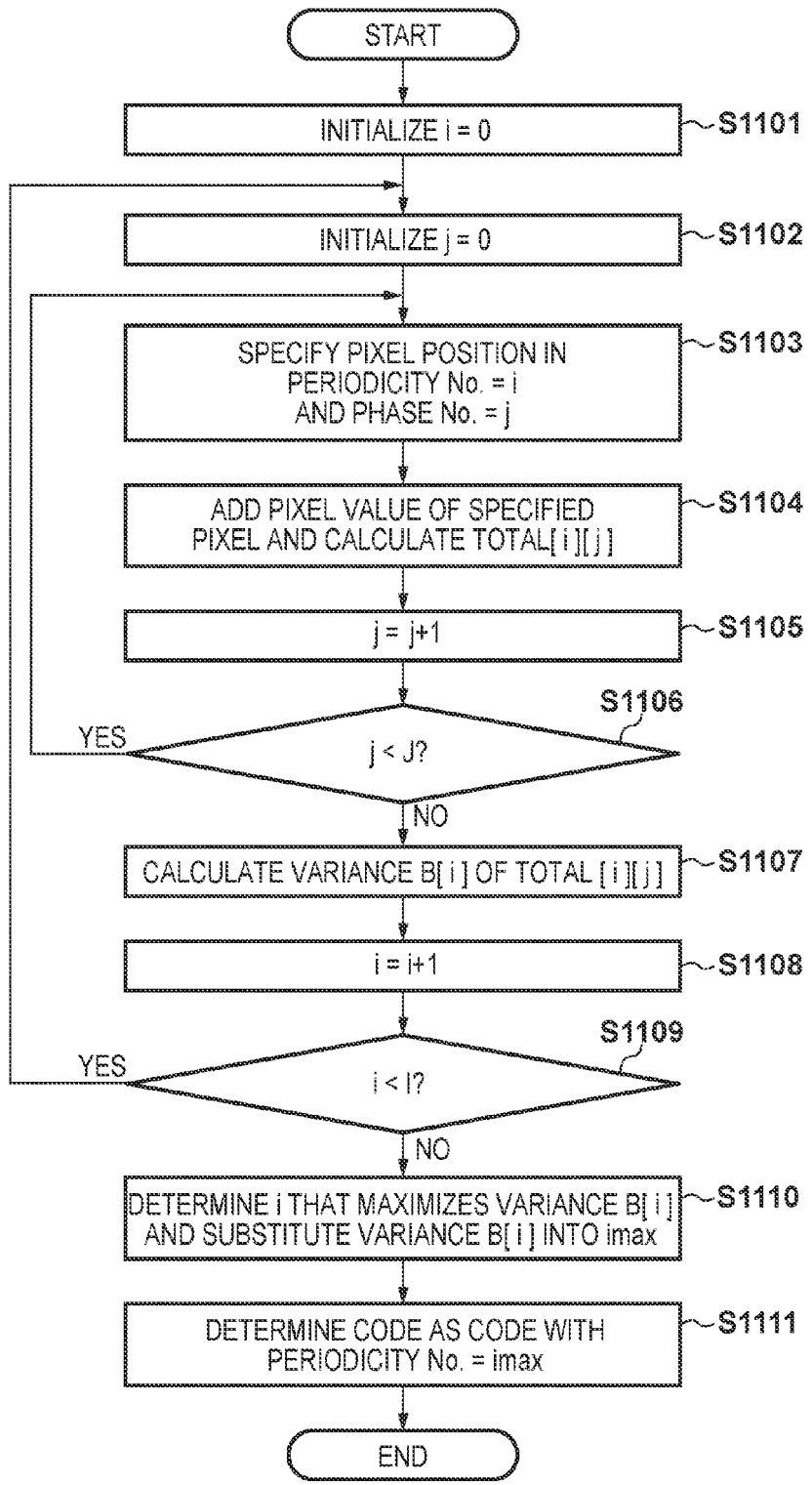
FIG. 11 is a flowchart showing the operation procedure of digital watermark decoding.

FIG. 11 is a flowchart showing the operation procedure of the pixel specifying units 706 and 707, the converted value addition units 708, the variance calculation units 709, and the determination unit 710 shown in FIG. 7. The procedure shown in FIG. 11 is executed by constituent elements shown in FIG. 7. More specifically, step S1103 is executed by the pixel specifying units, step S1104 is executed by the converted value addition units, step S1107 is executed by the variance calculation units, and steps S1110 and S1111 are executed by the determination unit 710. Parameter setting processing and determination processing between these steps may be performed by a control unit (not shown). The value of periodicity No. to be described with reference to FIG. 11 corresponds to the sequence of processing blocks from the pixel specifying units to the variance calculation units. In FIG. 7, the number of periodicity Nos. is two, that is, 0 and 1. That is, in FIG. 11, processes are executed in series while changing the value of the periodicity No. i. However, if the processing is implemented by hardware, as shown in FIG. 7, processes corresponding to different periodicity Nos. are executed in parallel. For this reason, when the procedure shown in FIG. 11 is executed by the arrangement shown in FIG. 7, steps S1108 and S1109 concerning the parameter i are not performed. Note that the processing shown in FIG. 11 may be performed by executing a program configured to implement the overall procedure shown in FIG. 11 by a processor such as a CPU or a controller (not shown). In the following explanation, the additional information demultiplexing unit 106 is the entity of the operation.

In FIG. 11, in steps S1101 and S1102, variables are initialized. The values of the variables i and j used in the procedure are initialized to 0.

Step S1103 is a step of determining the factors of the regularity of pixel positions to be specified by the pixel specifying units 706 and 707, that is, two factors "periodicity" and "phase". In this procedure, let i be the variable concerning the periodicity, and j be the variable concerning the phase. The conditions of the phase and periodicity are managed by numbers. The factors of a pixel position specifying method in which a periodicity number (to be abbreviated as No. hereinafter) is i, and a phase No. is j are set. This example will be described with reference to FIGS. 12 and 13. By the factors, the position of a processing target converted value in image data is specified. Note that i and j are indices representing the periodicity and phase, respectively, and will be sometimes referred to as the periodicity i and the phase j hereinafter.

Step S1104 is a step of adding the converted value at the position specified in the block. The added value is stored as a variable array TOTAL[i][j]. Normally, a plurality of pixels (converted values) are specified in accordance with the parameters i and j. Hence, in step S1104, the sum of converted values at the specified positions is obtained and stored in TOTAL[i][j].

In step S1105, the variable j is incremented. In step S1106, the variable j is compared with a fixed value J. J stores a predetermined number of times to perform the pixel position specifying processing while changing the phase. If the variable j is smaller than J, the process returns to step S1103 to repeat the pixel position specifying processing and the addition processing of a pixel (that is, a converted value) at a specified position based on the new phase No. according to the incremented variable j. If the value of the index j changes, the pixel position to be specified also changes.

When the pixel position specifying processing and the addition processing are performed based on the shifted phase the set number of times, in step S1107, a variance B[i] of the addition result TOTAL[i][j] is calculated. That is, the degree of variation of each addition result caused by a phase difference is evaluated. Here, i is fixed, and the variances of J results TOTAL[i][j] from 0 to (J−1) concerning the index j are obtained. The variance is B[i].

In step S1108, the variable i is incremented. In step S1109, the variable i is compared with the fixed value I. I stores the number of times of performing pixel position specifying processing while changing the periodicity. If the variable i is smaller than I, the process returns to step S1102 to repeat the pixel position specifying processing, the converted value addition processing, and variance calculation using a new periodicity No. condition according to the incremented variable i. The variance indicates a variation of the average value of values "1" (or the maximum pixel value such as 255) to a pixel corresponding to a specific phase index. The smaller the variation is, the smaller the variance is. The larger the variation is, the larger the variance is.

Upon determining in step S1109 that i reaches the set count I, I variances B[i] can be calculated. In step S1110, the maximum value of the variance is determined from the set of I variances, and the value i at this time is substituted into a variable imax.

Step S1111 is a code determination step. A code whose periodicity No. is imax is determined as a multiplexed code, and the processing ends. However, if no power spectrum appears upon filtering processing for the image on in the block, preferably, it is determined that the decoding process that is currently being executed is not a decoding process corresponding to the multiplexing method, and decoding fails, and the processing is ended. In contrast, if a power spectrum appears, it can be determined that decoding succeeds. This determination can be implemented by determining whether, for example, B[imax] meets a predetermined condition. As the predetermined condition, a condition that, for example, B[imax] is equal to or larger than a predetermined threshold can be employed. However, since the variance B is not a normalized value, a fixed threshold may be inappropriate. Hence, in step S1111, for example, a maximum possible variance Bmax is obtained and B[imax]/Bmax is compared with a predetermined threshold. If B[imax]/Bmax is smaller than the threshold, it is determined that the decoding fails, and the processing is ended. Instead of performing determination in one block, the decoding may be determined to fail when the condition is not met in a predetermined number of continuous blocks. Note that the variance Bmax can be obtained by, for example, the following procedure. That is, for an image in which a pixel value (converted value) at a position corresponding to a specific phase No. is set to "1" (or the maximum pixel value such as 255), and other pixel values are set to "0", a variance is obtained according to the procedure shown in FIG. 11, and the value of the variance is defined as Bmax. The value is stored and prepared in association with each quantization threshold matrix. This makes it possible to normalize B[imax]/Bmax such that it takes a value between 0 and 1 and compare it with a fixed threshold. Note that this threshold is experimentally decided.

An example in which I=2 and J=4 will be described. FIGS. 12 and 13 show pixel position specifying methods in a case in which the block size is defined by P=Q=16. Referring to FIGS. 12 and 13, one square in the blocks corresponds to one pixel. In FIGS. 12 and 13, the blocks have a square shape in which P=Q. However, the blocks need not always have a square shape and may have a shape other than a rectangle.

FIG. 12 shows a pixel position specifying method (corresponding to the pixel specifying unit A 706 in FIG. 7) in periodicity No.=0. FIG. 13 shows a pixel position specifying method (corresponding to the pixel specifying unit B 707 in FIG. 7) in periodicity No.=1. In FIGS. 12 and 13, a value added to each pixel in the blocks indicates a pixel corresponding to the phase No. j. The parameter j represents a phase. Since a pixel position in a pixel block is specified by a periodicity and a phase, a pixel at a position to be specified is marked with the value of the phase No. j in FIGS. 12 and 13. For example, a pixel indicated by "0" corresponds to a pixel at a position specified when j=0. That is, there are four types of phases in both FIGS. 12 and 13 which correspond to pixel specifying methods in a case in which the phase No. j is 0 to 3. That is, the matrix shown in FIG. 12 or 13 is specified in accordance with the value of the periodicity No., and the position of a pixel in the specified matrix is specified in accordance with the value of the phase No.

The periodicities of pixel positions corresponding to the same phase index (phase No.) shown in FIGS. 12 and 13 match the periodicity in FIG. 6A and the periodicity in FIG. 6B, respectively. As described above, in both FIGS. 6A and 6B, quantized values "1" (in binary expression using "0" and "1") readily line up in the arrangement of hatched squares. For this reason, in a block for which, for example, the quantization condition A is set upon multiplexing, the quantized values "1" easily line up at the periodicity shown in FIG. 6A. When filtering is performed using a spatial filter adapted to the periodicity, the frequency component is further amplified. Hence, the quantized values "1" concentrate to pixels at positions corresponding to a specific phase index. If converted values are specified based on the periodicity shown in FIG. 12 and added, the variance of the addition result becomes large.

In contrast, if filtering using an inadequate spatial filter is performed for the block for which the quantization condition A is set, and pixel positions are specified based on the periodicity shown in FIG. 13, the variance of the addition result of converted values becomes small. That is, since the periodicity of the quantized values and the periodicity of the specified pixel positions are different, the added value of converted values by the phase difference between the specified pixel positions is average, and the variation is small. On the other hand, in a block for which the quantization condition B is set upon multiplexing, the variance in small in FIG. 12, and large in FIG. 13.

The example of the flowchart shown in FIG. 4 is applied. In this case, bit=0 is set to the quantization condition A, and bit=1 is set to the quantization condition B. If the variance of the periodicity No.=0 is large (that is, if imax=0), it can be determined that bit=0. In contrast, if the variance of the periodicity No.=1 is large (that is, if imax=1), it can be determined that bit=1. That is, by associating the quantization condition, the spatial filter characteristic, and the periodicity of the condition to specify a pixel position, multiplexing and demultiplexing between an image and a code can easily be implemented. In this embodiment, two types of periodicities "0" and "1" are used, and a multiplexed code in a block is a 1-bit code. However, a multiplexed code may have more bits, as a matter of course. Needless to say, the type of the quantization condition, the type of the spatial filter, and the type of the periodicity No. (value I) of the pixel position specifying condition match each other.

As is apparent from the above explanation, the predetermined value J in the procedure shown in FIG. 11 represents the number of types of code information highly probably multiplexed on image data. The predetermined value I represents the number of phases that can be taken in one period. In this example, since the phase is a discrete value for each pixel, the number of pixels in one period may be represented by the value I.

The procedure shown in FIG. 11 is applied to each block shown in FIG. 5, and a code corresponding to the quantization condition of each block is determined. Then, for example, the W×H codes are arranged in the order of blocks, thereby reproducing the embedded code information. In this example, for example, the quantization condition A corresponds to "0", and the quantization condition B corresponds to "1". These codes are arranged in the order of blocks, thereby reproducing original code information. Note that when ($2^n$+1) different quantization conditions (that is, quantization threshold patterns) are prepared, and $2^n$ quantization conditions out of them are associated with n-bit code words, n-bit code information per block can be multiplexed.

If a multiplexed code can be specified by performing the procedure shown in FIG. 11 in one direction, the procedure shown in FIG. 11 is executed only in one direction of the image. For example, the quantization conditions (that is, code patterns) shown in FIGS. 6A and 6B can be discriminated by executing the procedure shown in FIG. 11 in one direction. However, if a multiplexed code cannot be narrowed down to one code only in one direction, the procedure may be executed in each of the horizontal and vertical directions. The value imax may be decided independently for each direction, and after that, the value imax may finally be decided by combining the values. For example, if the plurality of variances B[i] are almost the same in one direction, variances whose differences from the maximum variance are equal to or less than a predetermined value are selected as maximum value candidates. The periodicity indices i of the candidate variances are left as candidates of imax. Candidates of imax are decided for both of the horizontal and vertical directions, and the periodicity index i common to both directions is decided as final imax. A code associated with the index value imax is determined as a code multiplexed on the image.

The procedure shown in FIG. 11 can translate to a procedure of obtaining the correlation between image information and the pixel pattern of additional information. That is, the level of the correlation between image information on which additional information is multiplexed and a pixel pattern corresponding to each bit or bit group of the multiplexed additional information (a pattern corresponding to a quantization threshold) is obtained. If the correlation is lower than a predetermined level, the decoding is determined to fail. If the correlation is equal to or higher than the predetermined level, it is determined that the bit or bit group corresponding to the correlated pixel pattern is multiplexed. This means that multiplexed additional information can be decoded by executing not the procedure shown in FIG. 11 but the above-described procedure of obtaining a correlation. The procedure can also be regarded as a method of determining, for each block of an image with multiplexed additional information, the level of matching between the spatial frequency of image information included in the block and the spatial frequency of the pattern of a quantization threshold matrix, and if the level of matching is equal to or more than a predetermined level, decoding a code corresponding to the quantization threshold matrix.

In the first embodiment, a code can easily be demultiplexed without comparing the power value of a frequency corresponding to the regularity of a quantization condition by orthogonal transformation. In addition, since the processing is performed in the real space domain, demultiplexing processing can be implemented very fast.

The first embodiment has been described above. The quantization conditions A and B, the spatial filters A and B, and the pixel specifying units A and B are merely examples, and are not limited to those described above. Another periodicity may be given, and the number of taps of the spatial filter, the block size used to specify a pixel pattern, and the like may be larger or smaller than in the above-described example.

To easily explain the idea of the present invention, the operation procedure shown in FIG. 11 has been described as iterative processing of the variable i that is the periodicity No. and the variable j that is the phase No. In actuality, iterative processing using a pixel address in a block of P×Q pixels can be implemented more easily. That is, two kinds of information, that is, the periodicity No. and the phase No. are stored in advance as tables in correspondence with each pixel address in a block, as shown in FIGS. 12 and 13, and converted values are added for each of the variables of the corresponding periodicity No. and phase No. With this method, the added values of the sets of periodicity Nos. and phase Nos. can be calculated in parallel only by processing P×Q pixels.

In the operation procedure shown in FIG. 11, the variances of the addition results of converted values at specified positions after the spatial filters are calculated, and the variances are compared to determine a code. However, the method is not limited to this. A method of comparing evaluation functions without using variances is also usable. If the addition results of converted values at specified positions localize, the values are readily noticeable only for one phase when the phase is shifted. Hence, evaluating the "degree of variation" suffices.

For example, to evaluate the degree of variation, the following evaluation functions can be considered in addition to variances.

1. The difference between the maximum value and the minimum value of values obtained by adding converted values at specified positions 2. The difference between the maximum value and the second largest value of values obtained by adding converted values at specified positions or the difference between the minimum value and the second smallest value 3. The maximum value of the differences between consecutive values in a histogram created by values obtained by adding converted values at specified positions The evaluation functions 1, 2, and 3 represent absolute difference values. The relative ratio of one of the difference values to a converted value, a pixel value, or the sum of converted values can also be used as an evaluation function. A binary quantized value has been described above as an example. However, the quantized value is not limited to this.

As described above, according to the first embodiment, the quantization condition is changed for each block formed from M×N pixels, and an image is quantized in accordance with the quantization condition, thereby embedding predetermined information in the image. As compared to a conventional information embedding method, for example, a method of embedding information by orthogonal transformation, information can be embedded in an image such that degradation in image quality can be suppressed, and the embedded information can accurately be extracted at a high speed.

[Detailed Example of Code Multiplexing]

Details of a procedure of shooting, by the camera-equipped portable terminal 104, a multiplexed printed product that visualizes image information with multiplexed code information and displaying the contents of the code information obtained by decoding the image information obtained by the shooting will be described below with reference to FIGS. 14 and 15. This embodiment assumes various printed products such as a photograph, an advertising leaflet, and a ticket. Embedded information is assumed to be the detailed information of an object of a photograph, voice data and moving image data at the time of shooting, the producer, maker, or consume-by date of merchandise, the seat information of a ticket, or the like. Note that additional information embedded in image information will sometimes be referred to as multiplexed information hereinafter.

First, the user activates the multiplexing decoding application of the camera-equipped portable terminal 104. As shown in FIG. 14, the decoding application has a multiplexing decoding function S1401 of shooting a printed product, a multiplexing decoding function S1402 of decoding a plurality of different multiplexed patterns, an information storage function S1403 of storing pieces of information obtained by decoding in a plurality of different memory areas, and a content reproduction function S1404 of displaying a content on the display 109 of the camera-equipped portable terminal 104. Each function is implemented by a program executed by a processor (not shown) of the camera-equipped portable terminal 104, a hardware device controlled by it, or a combination thereof.

The user holds the camera-equipped portable terminal 104 over a printed product and adjusts it to a position to read a multiplexed pattern. In this state, the printed product is shot by the shooting function S1401, and the image is saved.

Next, a plurality of different decoding processes are performed for the shot image by the multiplexing decoding function S1402. In this embodiment, a case in which three different types of multiplexed information A, B, and C exist will be handled. Assume that one of the types of multiplexed information is embedded in the printed product. The multiplexing decoding function S1402 includes three different types of decoding processes A', B', and C' corresponding to the three different types of multiplexed information A, B, and C, respectively. They are shown in FIG. 15. That is, the embedded information can be acquired by performing the decoding process A' for the multiplexed information A, the decoding process B' for the multiplexed information B, and the decoding process C' for the multiplexed information C. Details of the decoding processes have already been described above with reference to FIGS. 7 and 11, and a description thereof will be omitted here. Note that the multiplexed information (that is, multiplexed additional information) A is additional information multiplexed by the procedure shown in FIG. 4 and demultiplexed by the procedure shown in FIG. 11. The pieces of multiplexed information B and C may be information multiplexed by the same method as described above using a different quantization condition. The pieces of multiplexed information B and C may be additional information multiplexed by a different method. As the multiplexing method, for example, a method of multiplexing information by embedding random noise, a method of overlaying information on an image using infrared ink or yellow ink that is hardly visually identified by human eyes, or the like is usable. These pieces of multiplexed information need to be decoded using a decoding method corresponding to the multiplexing method, as a matter of course. If a signal of a predetermined level cannot be decoded, the decoding is determined to fail in any method, and the decoding process can be stopped there.

Information acquired by decoding the code information embedded in the image information by each decoding process is saved in a memory area of the multiplexing decoding application by the information storage function S1403. The acquired predetermined information is, for example, the shooting date/time or person of a photograph, a voice at the time of shooting, the URL of a homepage including the information of the shooting position, merchandise information printed on an advertising leaflet of a supermarket, or tourist site information printed in a travel magazine.

Finally, the acquired predetermined information is displayed or reproduced by the content reproduction function S1404. For example, the name or profile of a person captured in a photograph or a voice at the time of shooting is reproduced, or access to a URL is made to display a homepage. Alternatively, the current price of merchandise of a supermarket or the current weather in a tourist site may be displayed.

A system for almost simultaneously executing a plurality of multiplexing decoding processes by processing (to be referred to as single thread hereinafter) in which the multiplexing decoding application performs a single decoding process while switching as needed will be described next. A shot image is saved in a memory area of the multiplexing decoding application.

Figure 16:
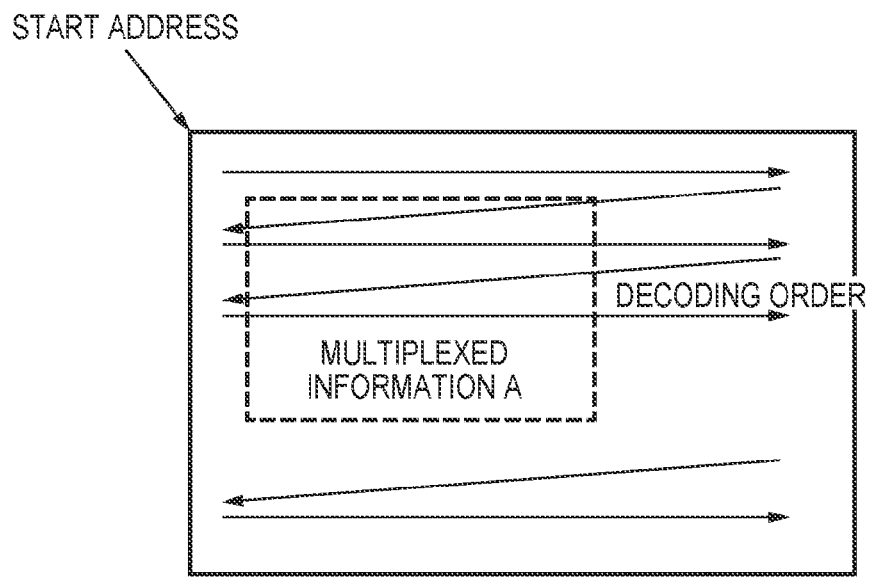
FIG. 16 is a view showing an image obtained by shooting a printed product in which one type of additional information is embedded.

Before the start of a decoding process, the user has no idea about the location and type of multiplexed information embedded in a printed product. Hence, as shown in FIG. 16, the decoding processes A', B', and C' are sequentially applied on the single thread from the start address of the shot image. For example, if the multiplexed information A is multiplexed using 10×10 pixels as one block, the decoding process A' for decoding a code multiplexed image using 10×10 pixels as one block is applied to the first block in the shot image. The first block is, for example, a block located first in the raster scan order out of blocks segmented by the procedure described with reference to FIG. 8. When decoded additional information is acquired, the information is stored in a memory area allocated for the decoding process A'. If the multiplexed information B is multiplexed using, for example, 20×20 pixels as one block, the decoding process B' for decoding a code multiplexed image using 20×20 pixels as one block is applied to one block in accordance with the above-described procedure. In this case as well, when decoded additional information is acquired, the information is stored in a memory area allocated for the decoding process B', as described above. For the multiplexed information C as well, the decoding process C' is applied similarly. In this way, the decoding processes are applied sequentially to the shot image while switching the plurality of different decoding processes. If information is acquired, it is stored in a corresponding memory area.

Here, the processing is performed while switching the plurality of different decoding processes A', B', and C' on the single thread for each block. If the user knows in advance that additional information is embedded in the printed product only by one multiplexing method, the multiplexing method is limited to the method that detects the additional information for the first time, and the subsequent decoding process is performed by the procedure corresponding to the multiplexing method. That is, the decoding processes A', B', and C' are applied to the shot image from the start address. If information is acquired first by the decoding process A', only the decoding process A' is subsequently applied up to the end of the image. This makes it possible to omit a burden to apply the decoding processes B' and C' and shorten the processing time.

On the other hand, another processing method is proposed for the single thread. First, the decoding process A' is applied to the entire shot image, that is, the whole image information. When the decoding process A' ends, the process returns to the first address of the image, and the decoding process B' is applied to the entire image next. When the decoding process B' ends, the decoding process C' is applied to the entire image. If embedded information is, for example, a moving image that takes time to decode the whole information, and the moving image cannot be reproduced unless decoding of the whole information is completed, the method of performing one decoding process for the entire image is preferable because the content can quickly be reproduced to the user.

A system for almost simultaneously executing a plurality of multiplexing decoding processes by processing (to be referred to as multithread hereinafter) in which the multiplexing decoding application performs a plurality of decoding processes in parallel will be described next. In this method, threads are set in accordance with the number of decoding processes, and different decoding processes are performed in the respective threads. As in the example of single thread, a shot image is stored in a memory are of the multiplexing decoding application so as to be accessible from each thread. Since the processing method using multithread enables execution of three decoding processes in parallel, the processing time can be shortened as compared to single thread. The result of each decoding process is stored in a memory area of the multiplexing decoding application by the information storage function S1403. If multiplexed information can be decoded by the decoding process A', a flag representing the result is set. This indicates the existence of the multiplexed information A on the printed product. For this reason, when other threads refer to the flag of the decoding process A', the decoding processes B' and C' can be ended at that point of time. By referring to the flag and stopping unnecessary threads, the number of threads can be decreased, and the processing load on the multiplexing decoding application can be reduced.

If the printed product cannot be shot well by the shooting function S1401 because of defocusing or a camera shake, it may be impossible to correctly read the multiplexed information by the multiplexing decoding function S1402. In this case, an error message may be displayed on the display 109 of the camera-equipped portable terminal 104 to cause the user to do shooting again.

Second Embodiment

Figure 17:
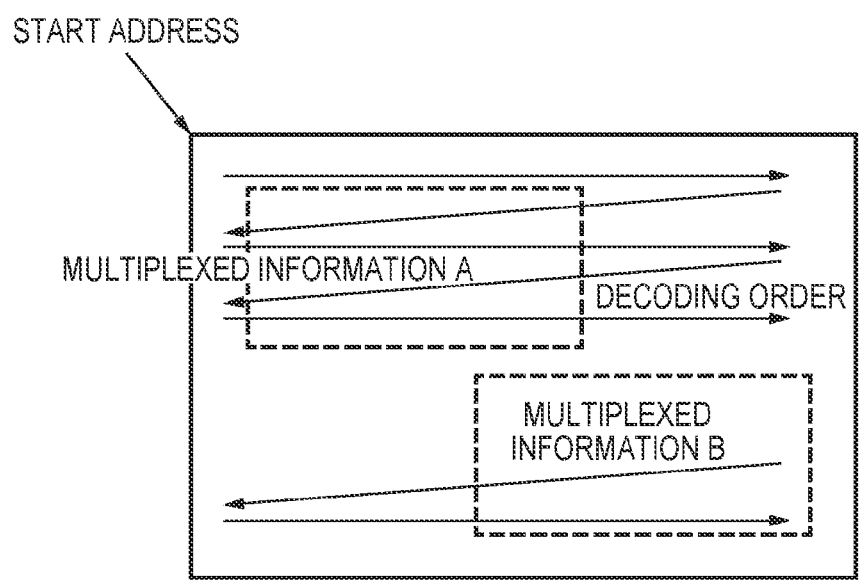
FIG. 17 is a view showing an image obtained by shooting a printed product in which two types of additional information are embedded.

This embodiment assumes that at least two of three different types of multiplexed information A, B, and C are embedded in a printed product, as shown in FIG. 17. Single thread and multithread will be explained again here.

When performing decoding processes on single thread, decoding processes A', B', and C' are applied from the start address of the shot image while sequentially performing switching on a block basis, as in the first embodiment. According to this method, multiplexed information A is decoded first (see FIG. 17). During this time, the decoding processes B' and C' are interrupted. After that, when the decoding process of the region of the multiplexed information A ends, the decoding processes A', B', and C' are applied to the image again while sequentially performing switching. Note that the end of the decoding process of the region of the multiplexed information A is triggered by a failure of decoding of a certain block by the decoding process A'. Hence, for regions from this block, decoding may be attempted by sequentially switching the decoding processes B' and C' except the decoding process A'. As for the decoded multiplexed information A, the information is displayed by a content reproduction function S1404 at the time of completion. With this procedure, the content can be displayed to the user without waiting for the next decoding process. When the decoding process is continued, multiplexed information B is decoded, as shown in FIG. 17. In this case as well, the decoding processes A' and C' are stopped until the decoding of the multiplexed information B is completed. This can shorten the processing time.

Information representing where the multiplexed information B exists in the image may be embedded in the multiplexed information A of FIG. 17. That is, after the multiplexed information A is decoded, the address is moved to the image region where the multiplexed information B is embedded, and only the decoding process B' is performed from there. That is, when the position of next or subsequent multiplexed information is embedded, the processing time can be shortened.

In the first embodiment, the decoding process A' is applied to the entire image, the decoding process B' is then applied to the entire image again, and the decoding process C' is then applied to the entire image again on the single thread. In this embodiment as well, the same processing method can be performed. In this case, position information representing where the image region decoded by the decoding process A' is located is saved by an information storage function S1403. The pieces of multiplexed information B' and C' are not embedded in the image region. Hence, when performing the decoding processes B' and C', they can be omitted by referring to the position information.

A method of performing decoding processes on multithread will be described next. As in the first embodiment, decoding processes are performed on three threads from the start address of a shot image. As described with reference to FIG. 17, the result of the multiplexed information A is acquired by the decoding process A', and the result of the multiplexed information B is acquired by the decoding process B'. The pieces of information are stored by the information storage function S1403. Normally, the multiplexed information A decoded first is reproduced by a content reproduction function S1404. However, if the multiplexed information A is, for example, the URL of a homepage, and the current network environment is difficult to connect, the multiplexed information B that should be displayed next cannot be displayed until the network is connected. In this case, the content display order is reversed such that the multiplexed information B that is the second acquired information is displayed first. For example, a standby time of content reproduction is prepared in the content reproduction function S1404. As for information that cannot be displayed in that time, the display order is moved to the last. Instead, a content scheduled to be displayed next is reproduced first. This allows the user to acquire a plurality of pieces of information while reducing the wait time.

As in the first embodiment, if information can be decoded by the decoding process A', a flag representing it is set by the information storage function S1403. This indicates the existence of the multiplexed information A in the upper left region of the printed product shown in FIG. 17. The decoding processes B' and C' on other threads are ended in this image region. If a signal representing the end point of the embedded information is added to the end of the multiplexed information A, the end of the multiplexed information A can be identified at the timing of decoding the signal. A flag is set by the information storage function S1403 for the image region whose end is identified. By referring to the flag from the decoding processes of other threads, the decoding processes are prohibited from being executed for the image region. The processing load on the multiplexing decoding application can thus be reduced.

A case in which one printed product is shot and subjected to a decoding process has been described above. The present invention can also be applied to a case in which one page including a plurality of photographs as in, for example, an album is shot. Assume that two photographs are arranged in one page of an album, the multiplexed information A is embedded in the first photograph, and the multiplexed information B is embedded in the second photograph. An image obtained by shooting the one page is nothing but the image shown in FIG. 17. As described above, predetermined information can be acquired from each of the two photographs by performing a plurality of different decoding processes for the shot image.

This embodiment assumes that the two pieces of multiplexed information A and B do not overlap each other on the printed product in FIG. 17. However, these pieces of multiplexed information may be printed in an overlapping state. As described above with reference to FIG. 7, multiplexed information according to this embodiment is embedded by controlling the periodicity. For this reason, if a plurality of pieces of multiplexed information overlap each other on the printed product, decoding may be impossible. If it is found, when performing a plurality of different decoding processes, that regions with embedded multiplexed information overlap each other, the multiplexing decoding application, for example, displays a warning representing it.

Third Embodiment

An example in which information invisible to a user is embedded in a printed product has been described in the above two embodiments. In the third embodiment, a printed product in which multiplexed information invisible to the user and information represented by a barcode or QR Code® visible to the user coexist will be described.

Multiplexed information invisible to the user can be embedded in an object such as a photograph or a pattern originally printed in a printed product without ruining the design of the printed product, as described above. However, the user cannot identify where the information is embedded in the printed product. On the other hand, information such as a barcode or a QR Code® visible to the user allows the user to grasp where the information is written in the printed product. However, since the information needs to be printed on a blank part of the printed product, free design layout may be impeded.

Considering these advantages and disadvantages, important information whose existence should be shown to a user is printed as a QR Code® so that everybody can readily identify it. To make a user to connect to a network for detailed information, a URL is included as a QR Code® in a printed product of, for example, an advertising leaflet, thereby increasing the convenience of the user. On the other hand, secondary information that does not merit ruining the design of a printed product or information that should be provided to only limited users is embedded in the original design of the printed product as multiplexed information.

Figure 18:
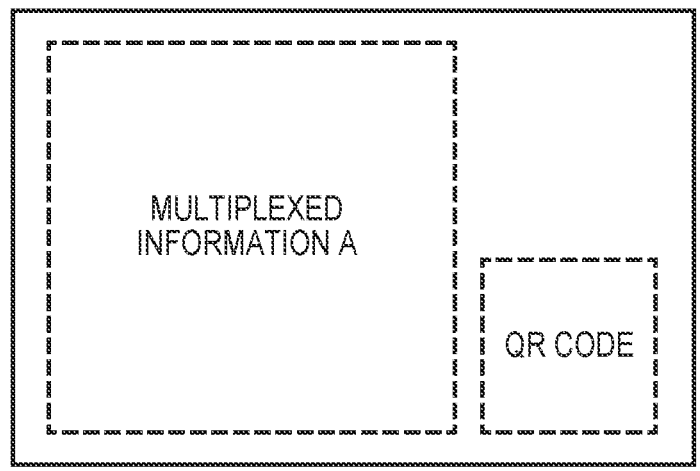
FIG. 18 is a view showing an image obtained by reading a printed product to which additional information and a QR Code® are added.
Figure 20:
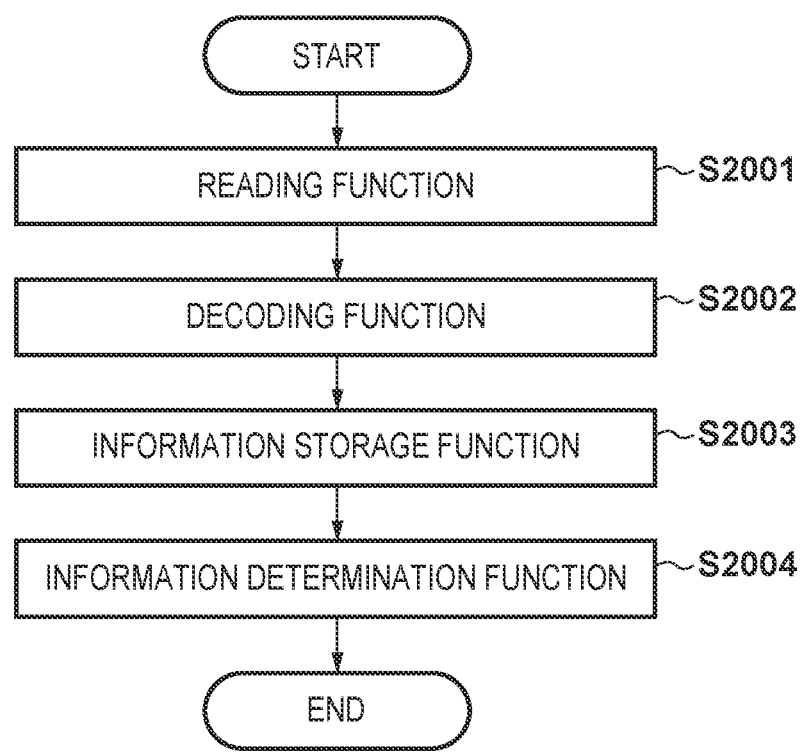
FIG. 20 is a flowchart until information is determined from a read image.

This will be described with reference to FIG. 18 using a concert ticket or airline ticket as an example. The imaging device described above is a camera-equipped portable terminal 104. Here, the device is a reading sensor placed in an entrance gate. An image shown in FIG. 18 is an image obtained by reading a ticket by the reading sensor. In a concert venue or an airport, a person sometimes holds a QR Code® over a reading sensor at an entrance gate and then enters the place. Buyer information, seat information, and the like are embedded in the QR Code® of the ticket. In widely known specifications such as a barcode or QR Code®, however, the contents of the information may be altered. In this case, it is effective to embed invisible multiplexed information near the QR Code®. The same information as the QR Code® or only information that must not be altered is arranged near the QR Code® as multiplexed information A. FIG. 20 shows the procedure of a decoding process in an entrance gate system. A ticket held over the reading sensor at the entrance gate is captured by a reading function S2001. A decoding function S2002 includes a processing part configured to decode the QR Code® and a processing part configured to decode the multiplexed information A. The QR Code® and the multiplexed information A are decoded on multithread from the capture image. The pieces of information acquired by decoding are stored in an information storage function S2003. Next, an information determination function S2004 collates the information acquired from the QR Code® and the information acquired from the multiplexed information A, and determines authenticity. To cope with a case in which the QR Code® is altered, and mismatch with the multiplexed information A occurs, a function of displaying a message representing that the entrance gate cannot open or that the ticket is a fake on the display of the entrance gate or making an electronic warning beep from the entrance gate is provided. The QR Code® that the user can readily identify is thus printed on the ticket to manage the contents, and simultaneously, the multiplexed information is embedded to prevent alteration. In a concert venue or an airport, a great number of visitors need to be handled in a short time. This embodiment can solve this problem by a plurality of different decoding processes on multithread.

Figure 19:
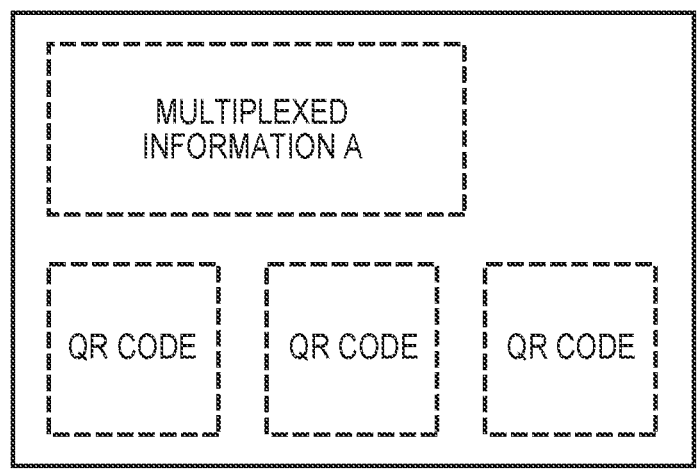
FIG. 19 is a view showing an image obtained by reading a printed product to which additional information and a QR Code® are added.

FIGS. 18 and 19 show examples of a printed product according to this embodiment. In FIG. 18, the area of the multiplexed information A is larger than the area of a QR Code® in the printed product. To the contrary, in FIG. 19, the area of QR Codes® is larger than the area of the multiplexed information A in the printed product. In a printed product of an advertising leaflet, if information to be explicitly shown to the user is small in amount, the number of QR Codes® is decreased, and secondary information is embedded in a photograph region of the advertising leaflet, as shown in FIG. 18. Pieces of necessary information can thus be embedded in one advertising leaflet without reducing the photograph region. On the other hand, for example, if the number of merchandise items carried on the advertising leaflet is large, and each merchandize item has information to be explicitly shown to the user, the photograph region is reduced. The number of QR Codes® is increased accordingly, and the QR Codes® are printed in a blank region. Multiplexed information is embedded in the photograph region. The amount of QR Codes® and the amount of multiplexed information are preferably thus decided in consideration of the amount of information to be explicitly shown to the user and the design layout of the advertising leaflet. At this time, the QR codes and the multiplexed information A are decoded by the decoding function S2002, and the pieces of acquired information are stored by the information storage function S2003, as described above. In this way, the user can acquire the pieces of information embedded in the advertising leaflet without switching the decoding method.

Another advantage can be obtained by embedding identical information in a printed product by the two methods using a QR Code® or barcode and multiplexed information. In general, the QR Code® or barcode is printed in black to increase visibility. That is, an inkjet printer often prints the QR Code® or barcode using only black ink. On the other hand, the multiplexed information is embedded in a photograph or a pattern and therefore generally printed using color inks (cyan, magenta, yellow, and the like) as well as black ink in many cases. The QR Code® cannot be printed if the black ink runs out halfway through printing or cannot be discharged due to clogging in the nozzles of the inkjet printer. At this time, if the multiplexed information is embedded in the printed product by the color inks, predetermined information can be acquired by decoding the multiplexed information.

Other Embodiments According to First to Third Embodiments

In the above-described embodiments, when performing a plurality of different decoding processes on single thread, the decoding processes A', B', and C' are performed in this order. However, the order of decoding processes is not limited to this. For example, if predetermined information can be acquired by the decoding process C' in a preceding shot image, the next decoding process may be started from the decoding process C'.

If a decoding process to be used by the user is fixed, the decoding process to be used is selected in advance on the UI of the multiplexing decoding application. Decoding processes that are not used can thus be omitted, and the processing load can be reduced.

When a plurality of different pieces of predetermined information are acquired from a plurality of different pieces of multiplexed information, the order to display them on the content reproduction function S1404 may be determined in advance. For example, if a plurality of photographs are laid out in one shot image, and a shooting date/time, a voice at the time of shooting, a shooting location, and the like are acquired from each photograph, audio files may be reproduced in chronological order of photograph shooting. Alternatively, one list may be created in the order of positions where the pieces of multiplexed information are embedded to display the information at once.

As the imaging device, the camera-equipped portable terminal 104 has been exemplified in the first and second embodiments, and the reading sensor in the entrance gate has been exemplified in the third embodiment. In the present invention, the device form is not particularly limited as long as it can shoot a printed product with embedded information. For example, a digital still camera with a communication function, or a digital still camera or a scanner connected to a personal computer may be used. The embodiments are applicable to any case in which, for example, an advertising sign posted outdoors is shot by a wearable camera incorporated in glasses or an onboard camera, and predetermined information is acquired from multiplexed information embedded there.

[Another Arrangement of Image Processing Apparatus]

Figure 33A:
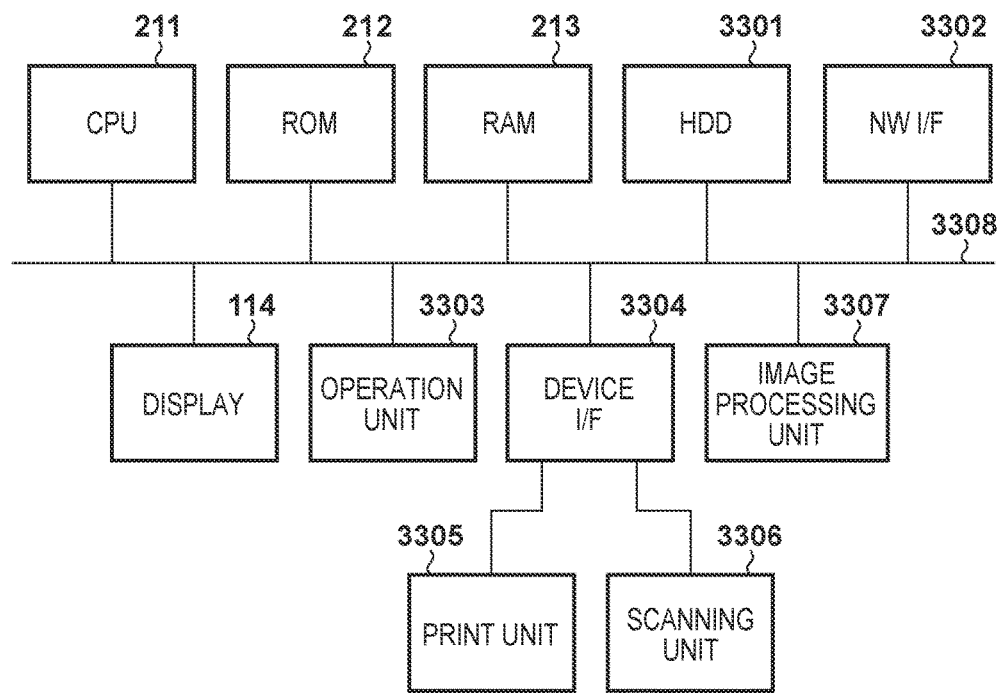
FIG. 33A is a block diagram showing another block arrangement of the image processing apparatus.

FIG. 33A is a block diagram showing an example of a block arrangement in a case in which an information processing apparatus including an additional information multiplexing unit 102 is implemented by software executed by a CPU. This arrangement may be provided to control the arrangement shown in FIG. 1A, as a matter of course. A description of parts common to FIG. 2 will be omitted. A CPU 211 is a processor that generally controls the information processing apparatus. The additional information multiplexing unit 102 shown in FIG. 1A can also be implemented by, for example, executing a program by the CPU 211. A ROM 212 and an HDD 3301 store the basic programs, control programs, various kinds of applications and data, and the like of the information processing apparatus. For example, the CPU 211 loads a program stored in the ROM 212 to a RAM 213 and executes it, thereby implementing the operation of each embodiment. The RAM 213 is also used as the working memory of the CPU 211.

A network interface (NW I/F) 3302 has an arrangement corresponding to the form of a network, for example, a wired or wireless network. The network I/F 3302 can also cope with a plurality of types of wireless networks for different communication ranges. For example, the network I/F 3302 can communicate with the camera-equipped portable terminal 104 by NFC (Near Field Communication) in a communication range of several cm.

A display 114 displays each setting screen or a preview screen to a user. An operation unit 3303 includes, for example, a keyboard or a touch panel and can accept an operation instruction from the user.

A device I/F 3304 connects a printing unit 3305 (printer engine) and a scanning unit 3306 to a system bus 3308. Another block such as a FAX may be connected to the device I/F 3304 in accordance with a function executable by the information processing apparatus.

An image processing unit 3307 executes image processing according to an application purpose for data acquired from outside or from the scanning unit 3306 or the like. For example, the image processing unit 3307 executes processing such as color space conversion, binarization, or image enlargement/reduction according to the printing method of the printing unit 3305.

The blocks shown in FIG. 33A are connected via the system bus 3308 so as to be communicable with each other. An arrangement other than that shown in FIG. 33A may be employed. For example, the system bus 3308 and an image bus are connected via a bus bridge. In this case, for example, the device I/F 3304 is connected to the image bus.

An input terminal 100 shown in FIG. 1A is configured to input information from, for example, the network I/F 3302, and an input terminal 101 is configured to input information from, for example, the network I/F 3302 or the operation unit 3303.

[Another Arrangement of Camera-Equipped Portable Terminal]

Figure 33B:
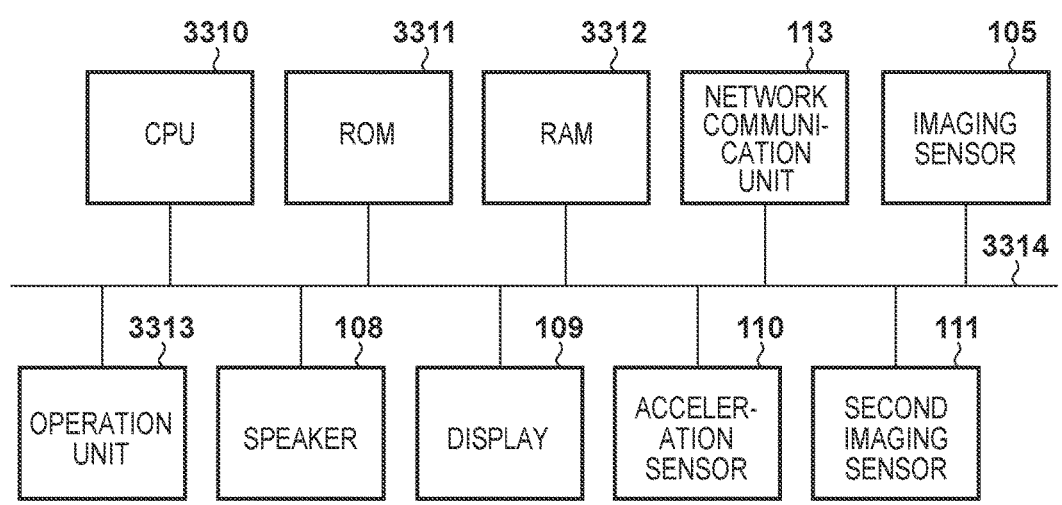
FIG. 33B is a block diagram showing another block arrangement of the camera-equipped portable terminal.

FIG. 33B is a block diagram showing a block arrangement of the camera-equipped portable terminal 104 in a case in which, for example, an additional information demultiplexing unit 106 is implemented by executing a program by a CPU. This arrangement may be provided to control the camera-equipped portable terminal 104 shown in FIG. 1B, as a matter of course. The camera-equipped portable terminal 104 includes components of a general-purpose information processing apparatus such as a CPU, a ROM, and a RAM. A CPU 3310 is a processor that generally controls the interior of the camera-equipped portable terminal 104. The additional information demultiplexing unit 106 shown in FIG. 1B is implemented by, for example, the CPU 3310. A ROM 3311 stores the basic programs, control programs, various kinds of applications and data, and the like of the camera-equipped portable terminal 104. For example, the CPU 3310 loads a program stored in the ROM 3311 to a RAM 3312 and executes it, thereby implementing the operation of each embodiment. The RAM 3312 is also used as the working memory of the CPU 3310.

A network communication unit 113 has an arrangement corresponding to the form of a network, for example, a wired or wireless network. Although not illustrated in FIG. 1A, the network communication unit 113 may thus be provided. The network communication unit 113 can also cope with a plurality of types of wireless networks for different communication ranges. For example, the network communication unit 113 can communicate with an image processing apparatus 115 by NFC (Near Field Communication) in a communication range of several cm.

A display 109 displays each setting screen or a preview screen to a user. An operation unit 3313 includes, for example, a touch sensor or hard keys and can accept an operation instruction from the user. An acceleration sensor 110 detects the posture of the camera-equipped portable terminal 104. The blocks shown in FIG. 33B are connected via a system bus 3314 so as to be communicable with each other.

Fourth Embodiment

Recently, contents and attractions using an AR (Augmented Reality) technology have become popular. AR is augmented reality that is a technology of adding information to a real environment so as to make a user experience an augmented world. Japanese Patent Laid-Open No. 2012-190085 discloses a technique of detecting a QR code from an image that is shot by the shooting unit of a marker recognition processing apparatus and includes the QR code and markers for three-dimensional position recognition, and making an access to a browsing site while displaying a three-dimensional image.

Figure 27:
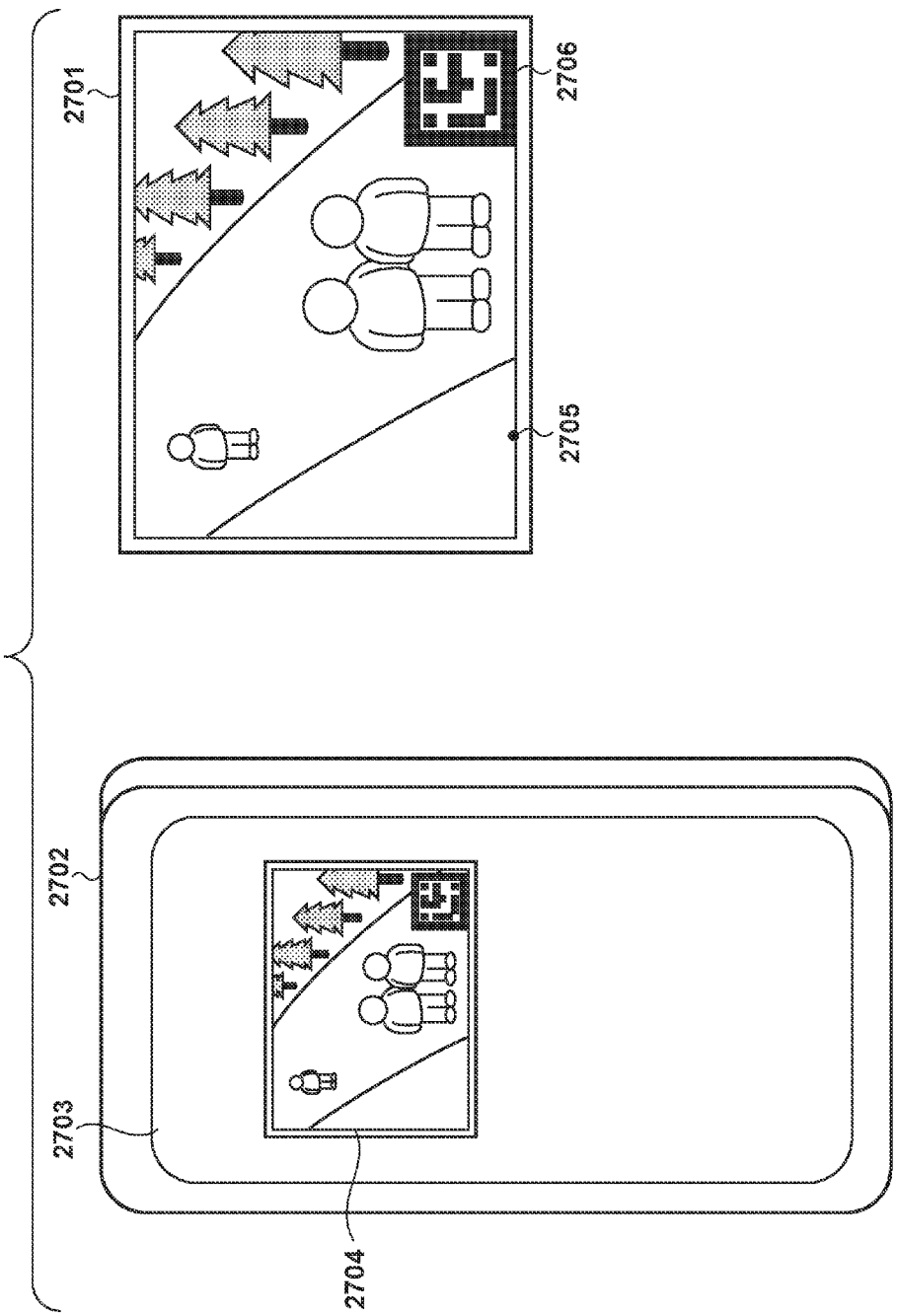
FIG. 27 is a view for explaining effect image processing using the AR technology.

FIG. 27 is a view for explaining another example of effect image processing using the AR technology. A code part 2706 is printed on a printed product 2701 together with a photograph part 2705. The user captures, on an application, the code part 2706 of the printed product by the camera of a smartphone 2702. The application analyzes the captured code and obtains download information. Based on the download information, the application is connected to a designated server via a network and obtains the feature amount of the image from the server. After that, the user captures the photograph part 2705 of the printed product 2701, thereby obtaining a user experience as if the photograph of the printed product 2701 moves on a display 2703 of the smartphone.

In this arrangement, as shown in FIG. 27, the space of the code part 2706 is necessary. The existence of the code part 2706 is considered to give an undesirable impression to the user from the viewpoint of enjoying the photograph. In addition, since the user needs to implement two actions of capturing the code part 2706 and then the photograph part 2705, the operation load on the user may be large.

This embodiment has been made to solve this problem, and provides an information processing apparatus that improves the convenience of a user in an arrangement for giving a special effect to a captured image, an information processing method, and a program.

Figure 21A:
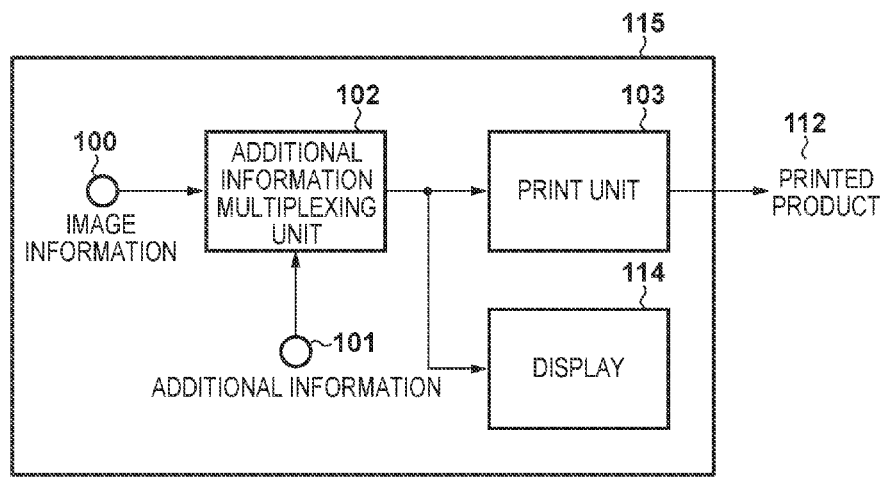
FIG. 21A is a block diagram showing the arrangement of an image processing apparatus.
Figure 21B:
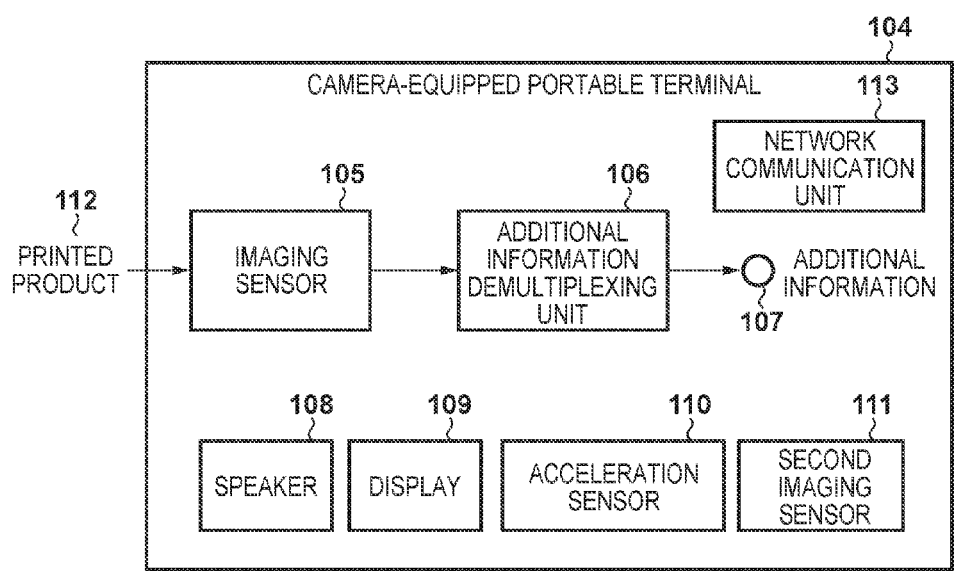
FIG. 21B is a block diagram showing the arrangement of a camera-equipped portable device.

FIGS. 21A and 21B are block diagrams showing the arrangement of an image processing system according to this embodiment. The image processing system according to this embodiment includes an image processing apparatus 115 shown in FIG. 21A and a camera-equipped portable terminal 104 shown in FIG. 21B. The image processing apparatus 115 is an apparatus having a print function, which is, for example, an MFP (Multi-Function Peripheral) or an SFP (single function peripheral). The camera-equipped portable terminal 104 is, for example, a camera-equipped portable telephone, a camera-equipped smartphone or tablet PC, or a wearable terminal such as a smart glass or a smart watch.

In this embodiment, the image processing apparatus 115 prints a printed product 112 on which additional information is multiplexed. The camera-equipped portable terminal 104 captures the printed product 112 by an imaging sensor 105 (camera). In this embodiment, the image processing apparatus 115 and the camera-equipped portable terminal 104 may be communicable with each other via a wired network or a wireless network, or may not be communicably connected via a network or the like.

The image processing apparatus 115 includes an additional information multiplexing unit 102 that embeds additional information in the printed product 112, and the camera-equipped portable terminal 104 includes an additional information demultiplexing unit 106 that reads the multiplexed additional information from the printed product. The additional information multiplexing unit 102 is implemented as, for example, printer driver software or application software that creates image information to be output to a printing unit 103 (printer engine). The additional information multiplexing unit 102 may be implemented as a form incorporated as hardware and software in a copying machine, facsimile apparatus, printer main body, or the like. The additional information multiplexing unit 102 and the printing unit 103 may be mounted on different devices. For example, the additional information multiplexing unit may be implemented in an application of a smartphone and send a multiplexed image as an output to a printer that is another device, and the printer may perform printing. When the additional information multiplexing unit 102 and the printing unit 103 are implemented by different devices, the printing unit 103 is, for example, a printer such as an inkjet printer or a laser printer. As another example, an image shot by a digital still camera is sent to another device such as a smartphone or a PC via a wireless network. The additional information multiplexing unit may be provided in the smartphone or PC to multiplex the image. The additional information demultiplexing unit 106 may be implemented as, for example, internal application software or hardware that demultiplexes additional information from an image shot by a digital still camera.

[Arrangement for Embedding Additional Information]

Multi-tone image information is input from an input terminal 100, and necessary additional information to be embedded in the image information is input from an input terminal 101. Examples of the additional information are information other than the image information input to the input terminal 100, for example, voice information, moving image information, text information, and 3D object data. The additional information may be pieces of information such as feature amount information, copyright, shooting date/time, shooting location, and user regarding an image input to the input terminal 100, or completely different image information. In addition, the additional information may be, for example, address information of a server such as a URL where the above-described pieces of information are stored.

In this embodiment, the feature amount information of the image of image information input to the input terminal 100 and a URL where a moving image related to the image exists are input to the input terminal 101 as additional information to be embedded. The feature amount information of an image is information that represents whether a specific image exists in an image captured by the camera of the camera-equipped portable terminal 104, and if a specific image exists, specifies the position, angle, size, and the like of the image in real time, as described above. Examples are an edge of an image or the corner information, vector, color, and shape of an edge. This information can be obtained using a known local feature amount detection method or the like.

The additional information multiplexing unit 102 embeds (multiplexes) additional information in image information such that the additional information is difficult to visually discriminate. The additional information multiplexing unit 102 also executes quantization of input multi-tone image information as well as multiplexing of the additional information. The additional information multiplexing unit 102 multiplexes the feature amount (information that represents whether a specific image exists, and if a specific image exists, specifies the position, angle, size, and the like of the specific image in real time) of an image as additional information on the image. Note that the additional information multiplexing unit 102 may multiplexes information (URL) capable of acquiring the feature amount as additional information on an image.

The printing unit 103 is a printer engine that prints information created by the additional information multiplexing unit 102 on a print medium. That is, the printing unit prints an image with multiplexed additional information on a print medium.

Note that as in the first to third embodiments, by the arrangement shown in FIG. 33A, a CPU 211 executes a program to control the apparatus and function as the additional information multiplexing unit 102, thereby implementing the image processing apparatus 115 according to this embodiment.

[Arrangement for Reading Additional Information]

A reading application executed on the camera-equipped portable terminal 104 shown in FIG. 21B acquires information on the printed product 112 read using the imaging sensor 105. The reading application outputs, to an output terminal 107, additional information embedded in the printed product 112, which is demultiplexed using the additional information demultiplexing unit 106. The output terminal 107 is an interface that outputs the acquired additional information. For example, voice information is output to a speaker 108 of the camera-equipped portable terminal 104, and image information is output to a display 109. The additional information may be output to an interface that outputs data to an external device. If the camera-equipped portable terminal 104 includes a plurality of imaging sensors, the printed product 112 may be shot by a second imaging sensor 111. In this embodiment, the additional information demultiplexing unit 106 acquires the feature amount information of an image input to the input terminal 100 and the information of a URL where a moving image related to the image exists, which are embedded in the printed product 112. As in the first to third embodiments, by the arrangement shown in FIG. 21B, the CPU 211 executes a program to control the apparatus and function as the additional information demultiplexing unit 106, thereby implementing the camera-equipped portable terminal 104 according to this embodiment.

[Generation Processing of Printed Product]

Details of generation of a printed product with multiplexed information will be described next.

Figure 28:
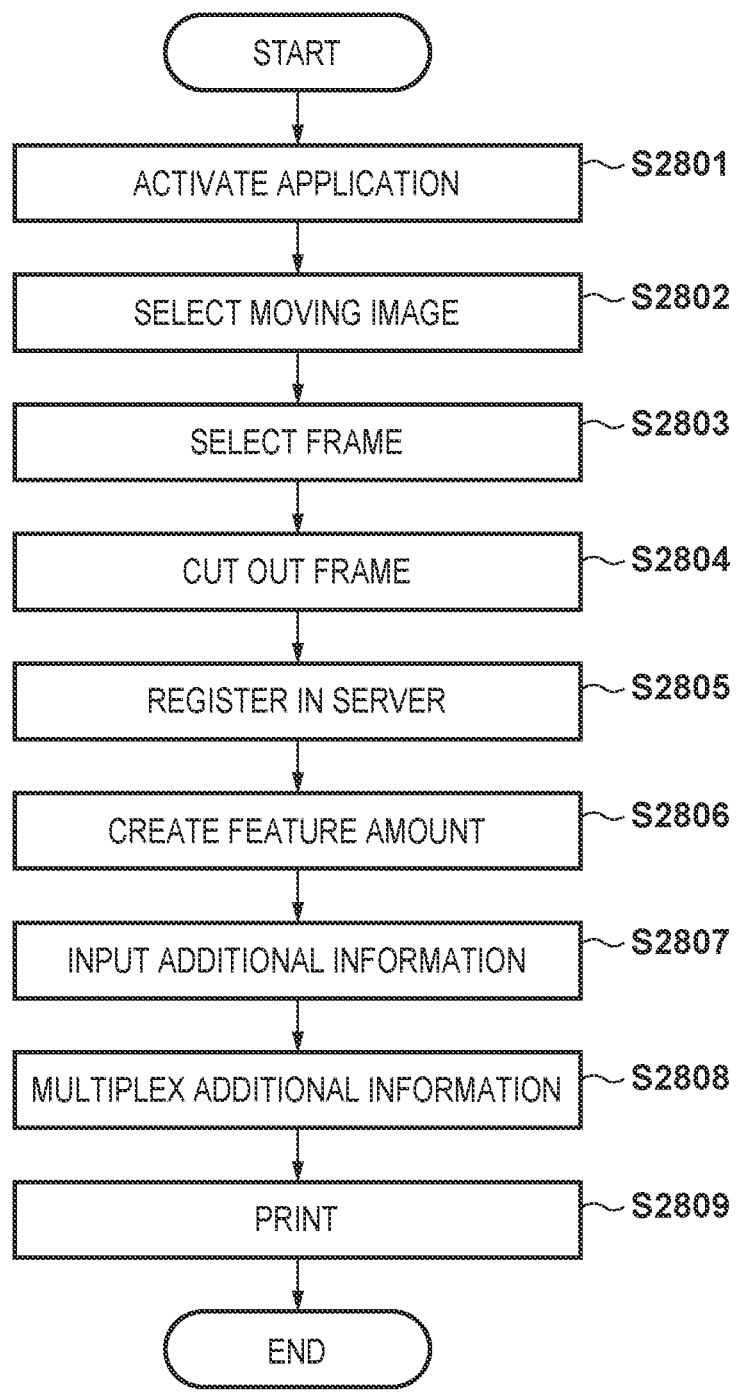
FIG. 28 is a flowchart showing generation processing of a printed product on which information is multiplexed.

FIG. 28 is a flowchart showing generation processing of a printed product in which additional information is embedded according to this embodiment. A purpose here is to perform special effect image processing using the AR technology for an image such as a printed photograph. The special effect image processing indicates, for example, giving a moving image effect to an image by combining moving image data with captured still image data. Note that data obtained by capturing will sometimes simply be referred to as captured data. Alternatively, the special effect image processing indicates, for example, giving a 3D effect to an image by combining 3D object data with captured still image data. The 3D object data will be described in the fifth embodiment. The processing shown in FIG. 28 is implemented when, for example, the CPU 211 of the image processing apparatus 115 loads a program stored in a ROM 212 to a RAM 213 and executes it.

In step S2801, an information multiplexing print application (to be referred to as a print application hereinafter) of the image processing apparatus 115 is activated in accordance with a user instruction. Note that in this embodiment, a description will be made using the image processing apparatus 115 in which the additional information multiplexing unit 102, the printing unit 103, and a display 114 are integrated. Hence, the print application also operates on the image processing apparatus 115. On the other hand, a form in which, for example, a smartphone includes the additional information multiplexing unit 102, and a printer includes the printing unit 103 can also be considered, as described above. In this case, the processing shown in FIG. 28 is processing executed by the smartphone (portable terminal). In step S2802, the print application accepts selection of a moving image of a print target. For example, the user selects the moving image of the target using an input device such as a pointing device or a keyboard or by a touch operation on a touch display. When selecting a moving image, for example, moving image files saved in the terminal are preview-displayed, and the user makes selection. Note that the moving image may be a moving image on a network or a moving image saved in a storage such as a memory card.

In step S2803, the print application selects an arbitrary frame of the moving image selected in step S2802. The frame selection is implemented by, for example, reproducing the moving image and causing the user to select a frame by doing pause or frame-by-frame advance or selecting a reproduction frame using a slide bar while viewing frames. Alternatively, the application may uniquely select a start frame or use a method of analyzing the moving image, giving scores by known techniques such as face detection, facial expression evaluation, blur/defocus evaluation, and composition evaluation, and selecting an optimum frame.

In step S2804, the print application cuts out the frame selected in step S2803. Cutting out indicates acquiring a frame as one still image. For example, the application allocates a memory for the Width×Height [pixels] of the moving image and writes the RGB values of the above-described frame to the memory. The memory includes a capacity of Width×Height×3 [Bytes]. Here, 3 Bytes correspond to RGB elements and mean that R needs 8 [bits](1 [Byte]), G needs 8 [bits], and B needs 8 [bits]. A bitmap image of 8 [bits]×3=24 [bits] is thus completed. This image will be referred to as a cutout frame (or image) hereinafter. In this embodiment, the cutout image is image information input to the input terminal 100 shown in FIG. 21A, or visible information about the printed product 112. In this embodiment, the bitmap image is an image in an sRGB space. For this reason, if the color space of the moving image is not sRGB, conversion to sRGB is performed using a known color space conversion technique. If another color space supported by the printer exists, conversion to the color space may be performed.

In step S2805, the print application registers a moving image file in a server. The print application communicates with an external server, and uploads a moving image file corresponding to the moving image selected in step S2802. The server is a server that the reading application of the camera-equipped portable terminal 104 can access to download a moving image file. The server may be a dedicated server for information multiplexing printing and reading or a server in a site that provides an arbitrary moving image sharing service. When using an arbitrary moving image sharing service, if the user does not want to make the moving image open to the public, services that cannot limit viewing need to be excluded from service candidates. In this embodiment, an arrangement using the dedicated server will be described.

The dedicated server adds a unique ID (identification information) to the uploaded moving image file to identifiably manage it. The server returns the ID or a cipher created from the ID to the print application of the image processing apparatus on the client side. The cipher need only be of a type capable of identifying the ID in the dedicated server. For example, a list (long text) of random characters may uniquely be created in the server. The server includes a table that associates an ID with a long text, and can search for an ID from a long text by looking up the table. A long text is created because a character list that is as long as possible can withstand an attack such as hacking. Note that the long text itself may be used as an ID. In this embodiment, a description will be made assuming that the long text itself is the ID. When the length of characters is decided based on a capacity that can be embedded in a printed product by information multiplexing, and the print application of the image processing apparatus that is the client notifies the server of it, the server can issue a character string of a maximum length.

In step S2806, the print application creates a feature amount. As described above, the feature amount information of an image is information that represents whether a specific image exists in an image captured by the camera of the camera-equipped portable terminal 104, and if a specific image exists, specifies the position, angle, size, and the like of the specific image in real time. Examples are an edge of an image or the corner information, vector, color, and shape of an edge. This information can be obtained using a known local feature amount detection method or the like. Here, a local feature amount is calculated for the image cut out from the moving image in step S2804, and used as feature amount information. The feature amount can be text information using numbers and characters or a binary value. The feature amount may be a vector or a coordinate. The feature amount may be compressed. The capacity to be embedded by multiplexing can thus be reduced.

Note that the cutout image is printed later to create the printed product 112. The reading application of the camera-equipped portable terminal 104 (to be described later) captures the printed product 112 by the camera, and using the feature amount, searches the captured video for the image cut out from the moving image in step S2804.

Between printing and camera capturing, the tint, grayscale, resolution, and the like of the cutout image may change from those in the cutout state. For example, as for a printer or a camera, a device that enhances the saturation and contrast to attain an attractive output result is widespread. Some printers cannot reproduce the color space of an input image such as sRGB by a color material scheme such as CMYK. In this case, colors different from those of the input image are output. To the contrary, some printer models capable of reproducing colors in a range wider than the color space of an input image such as sRGB output colors beyond the color space of the input image. In a camera as well, the colors or resolution changes depending on a shooting condition such as a light source or a distance. For this reason, considering the change in printing or camera capturing, a feature amount may be calculated from an image obtained by performing resolution conversion or correction of brightness or colors for the cutout image. This makes it possible to improve the search accuracy of the reading application under a predetermined condition.

In step S2807, the print application inputs additional information. In this embodiment, the additional information includes the feature amount information calculated in step S2806 and the ID added to the moving image file uploaded in step S2805. As described above, the above-described dedicated server issues the ID. When implementing this embodiment using a dedicated server, the reading application holds access information to the dedicated server. Hence, the URL or IP address of the server need not be embedded as multiplexed information. The capacity to be embedded as multiplexed information can thus be reduced using the dedicated server. In an arrangement that uploads a moving image file to the server of a moving image sharing service in step S2805, the additional information is information that allows the reading application of the camera-equipped portable terminal 104 to reproduce the moving image file by download or streaming. The information is, for example, login information such as a user name and password of a site, or the URL or ID of the moving image file. Hence, these pieces of information are input as additional information to the additional information multiplexing unit 102 via the input terminal 101 shown in FIG. 21A.

Alternatively, these pieces of information may be stored in another management server, and the server may manage the information by an ID. When the reading application accesses the management server and transmits an ID, the management server returns the above-described login information or URL. The management server thus needs to manage only character information such as the login information or URL of a smaller capacity as compared to the moving image file, and the storage capacity, the capability of the communication channel, and the like can be suppressed. In this case, the ID stored in the management server is included in the additional information.

In step S2808, the print application multiplexes the additional information and the image information to create a multiplexed image. The additional information multiplexing unit 102 shown in FIG. 21A creates the multiplexed image using the above-described image information and additional information. In this embodiment, the multiplexed image is an image after unique halftoning according to multiplexing processing and error diffusion. Details of a multiplexed information embedding method will be described later.

Note that in this embodiment, multiplexed information is embedded by error diffusion. However, multiplexing may be performed by converting a multivalued image of RGB or the like into a color space such as L*a*b* or YCC and performing addition/subtraction to/from each element (for example, L*, a*, or b* in the L*a*b* color space) on a pixel basis. In this case, the printer converts the image that has undergone addition and subtraction into a corresponding color space as an input, performs normal color correction, color separation, gamma correction, halftoning, and the like, and prints the image. Examples of the corresponding color space as an input to the printer are the sRGB color space and the CMYK color space. Addition/subtraction may be performed for each element (R, G, and B) of an RGB image.

When reading, the multiplexed information can be read by converting the image into the same color space as the converted color space such as L*a*b* or YCC described above. To human eyes, the printed product in which information is embedded by multiplexing looks like a normal printed product without embedded information. The reason will be described. A signal is embedded in a pixel unit of halftone or image data or a frequency close to it. Since the frequency is hardly perceived by human eyes at a normal observation distance, it is difficult to recognize the information. Hence, in this embodiment, the multiplexed information or signal is called invisible information. In contrast, a barcode or a two-dimensional code such as QR code, that is, information that allows a human to easily recognize the existence of a signal (data) is called visible information.

Note that as another method of embedding invisible information in an image, a mechanism may be used in which a barcode, a two-dimensional code, or the like is be printed using a special color material such that the code can be read when the printed product is irradiated with special light such as UV light. Alternatively, a code or the like may be printed in the same way as described above using a color material that returns invisible light, and reading may be performed using a camera capable of sensing the invisible light.

In step S2809, the print application performs printing. More specifically, the print application transmits the multiplexed image created in step S2808 to the print unit 103, thereby performing printing. As a result, the printed product 112 created by printing the image with the multiplexed information on a printing paper sheet (print medium) is output. That is, the printed product 112 can be said to be a print medium including both the image as visible information and the additional information as invisible information. Note that in a form in which the print application is executed on a smartphone or the like, the processing of step S2809 corresponds to processing of transmitting print data from the smartphone to the printer in accordance with an instruction of the print application.

[Reading Processing of Printed Product]

Figure 29:
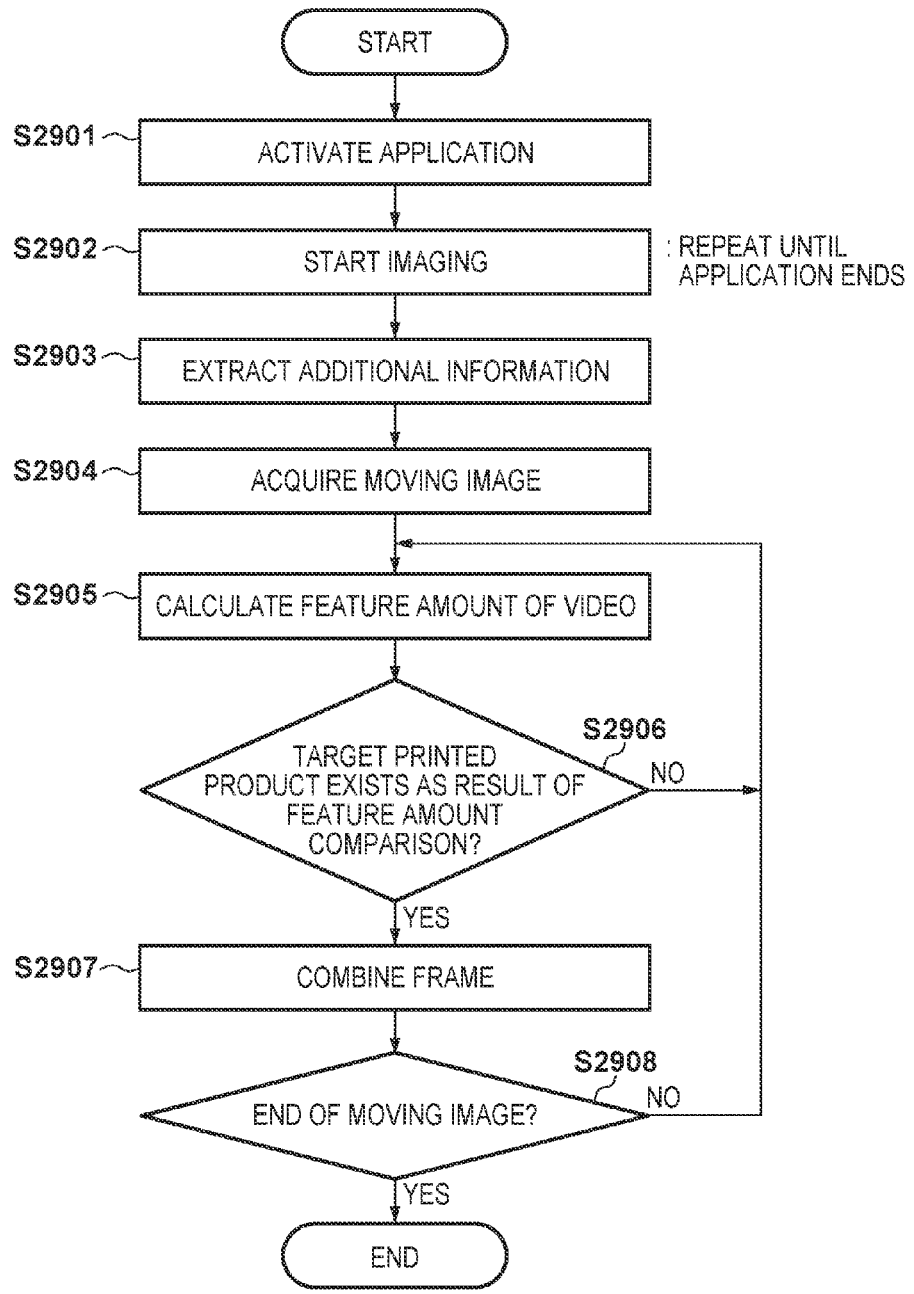
FIG. 29 is a flowchart showing reading processing of a printed product on which information is multiplexed.

FIG. 29 is a flowchart showing the processing of an application for reading the printed product 112 with multiplexed information, which is output in step S2809. The processing shown in FIG. 29 is implemented when, for example, a CPU 3310 of the camera-equipped portable terminal 104 loads a program stored in a ROM 3311 to a RAM 3312 and executes it.

In step S2901, an information multiplexing reading application (to be referred to as a reading application hereinafter) is activated in accordance with a user instruction. Note that the reading application operates on the camera-equipped portable terminal.

In step S2902, the reading application instructs the camera mounted on the camera-equipped portable terminal 104 to perform image capturing. The reading application displays, on the display 109, a video that is being captured by the camera function of the camera-equipped portable terminal 104. The user captures the printed product 112 while confirming, on the display 109, the portion that the camera is capturing. Assume that the capturing is performed such that the printed product 112 of the imaging target is included within the display 109. During this time, the imaging sensor 105 continuously acquires a captured image at a rate of, for example, 30 times per sec. The capturing is continued up to the end of the reading application.

Note that not all the acquired images need be used in subsequent step S2903. For example, images acquired at a predetermined interval such as once a second may be used, or the interval may be changed in accordance with the performance or state of the camera-equipped portable terminal 104. The performance includes the processing speed of the CPU or GPU, the memory capacity, the speed of memory transfer, the sensitivity and the number of pixels of the camera, the processing speed of the camera module, function limit by the OS, and the like. The state includes a remaining battery life, a charging or non-charging state, the influence of the OS or another application process, the number of CPU cores and memory capacity that are usable, the number of GPU cores, and the like. In addition, using a function of evaluating a blur or defocusing of an image, images of high evaluation values within a predetermined time such as 1 sec may be used. In this embodiment, an acquired image is a 24-bit image formed from 8-bit R, G, and B components.

In step S2903, the reading application extracts the multiplexed additional information. The additional information demultiplexing unit 106 demultiplexes additional information from an image acquired from the imaging sensor 105 in step S2902, thereby extracting the additional information. The additional information includes the feature amount information and the ID input in step S2807 and multiplexed in step S2808. In an arrangement that uploads a moving image file to the server of an arbitrary moving image sharing service, the additional information is information that allows the reading application to access and reproduce the target moving image file. Details of demultiplexing of the additional information will be described later. Capturing by the camera in step S2902 and additional information extraction in step S2903 are repetitively performed until the additional information can be extracted. When the additional information extraction is completed, the reading application notifies the user of the success of reading by display on the display 109 or sound generation from the speaker 108.

In step S2904, the reading application acquires a moving image (data acquisition operation). The reading application accesses, via an external network, the dedicated server in which the moving image file is registered by uploading in step S2805. The reading application transmits the ID included in the additional information extracted in step S2903. Upon receiving the ID, the dedicated server processes the moving image file identified by the ID to a downloadable state for the reading application. For example, the dedicated server issues a URL that is usable only during a predetermined time, and transmits the URL to the reading application of the camera-equipped portable terminal 104. The destination of the URL is the moving image file of the target. The use time is set to a predetermined time because it prevents a third party from inappropriately accessing the moving image file by hacking.

In an arrangement that uploads a moving image file to the server of an arbitrary moving image sharing service, the reading application accesses the target moving image file using the URL, login information, and the like extracted from the additional information.

In this way, the reading application attains a state capable of starting reproducing the moving image by download or streaming of the moving image file. Moving image reproduction to be described later is executed by the reading application using the function of the OS of the camera-equipped portable terminal 104 or a known codec mounted on the reading application itself.

In step S2905, the reading application calculates the feature amount of the video captured in steps S2902. The reading application sequentially acquires an RGB image by the capturing operation of the camera which is repetitively performed from step S2902. The reading application executes the same processing as the feature amount creation in step S2806 for the acquired RGB image, and creates the feature amount of the RGB image concerning the video captured in step S2902.

In step S2906, the reading application compares feature amounts. The reading application compares the feature amount information extracted as additional information in step S2903 with the feature amount of the captured image created in step S2905, and determines whether the target image printed on the printed product exists in the captured image. This is called matching. In step S2906, if the target image exists, a coordinate position, angle, and size of the target image in the captured image are acquired. This is equivalent to acquiring a state such as a position or angle on a three-dimensional space. Upon determining, as the result of feature amount comparison, that the target printed product does not exist in the captured image, the processing of the reading application returns to step S2905 to acquire a new RGB image and create the feature amount of the RGB image. On the other hand, upon determining that the target printed product exists in the captured image, the processing of the reading application advances to step S2907.

In step S2907, the reading application performs combining frames. The reading application starts reproducing the moving image based on the moving image file set in the reproduction start enable state acquired in step S2904. At this time, the reading application acquires a frame of the moving image and deforms the frame of the moving image in accordance with the angle and size of the target image acquired in step S2903. The reading application overwrites the deformed frame on the target image in the frame of the RGB image acquired in step S2902. The position to combine at this time is the coordinate position acquired in step S2906. The reading application renders, on the display 109, the combined image obtained in step S2907.

In step S2908, the reading application determines whether reproduction of the moving image ends. Upon determining that reproduction of the moving image does not end, the processing is repeated from step S2905. In step S2907 of the second and subsequent times, the processing is performed by acquiring a frame next to the previously reproduced frame of the moving image.

Figure 26A:
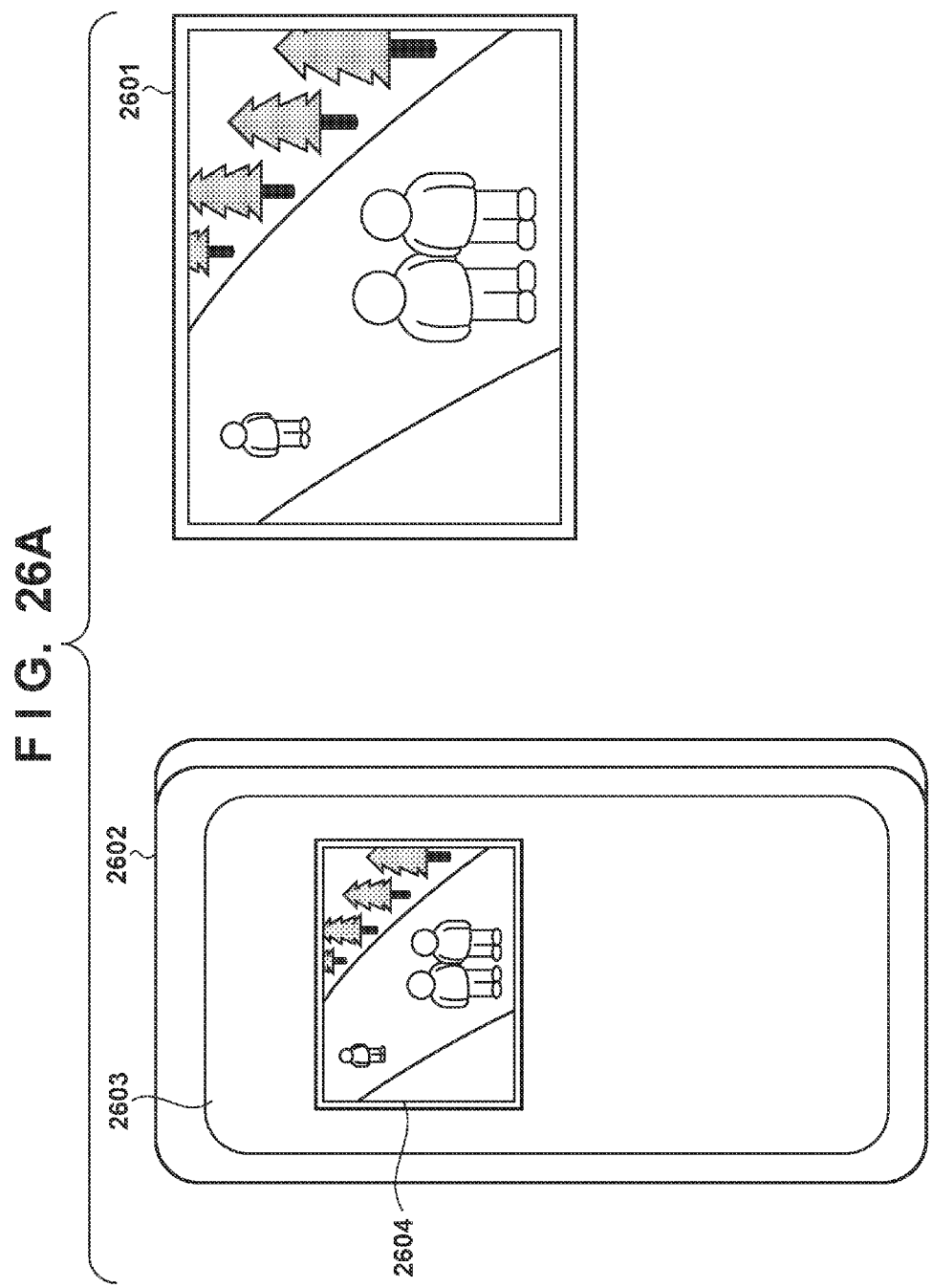
FIG. 26A is a view for explaining effect image processing using the AR technology.

With the above processing, the user can have an experience of viewing the display 109 on which the image on the printed product looks as if it moves. An example of the result is shown in FIGS. 26A and 26B. Referring to FIG. 26A, the user captures an image including a printed product 2601 using the camera function of a smartphone 2602. Then, a moving image as the cutout source of the printed product 2601 is reproduced in a region 2604 of a display 2603 as if the image of the printed product 2601 moved.

FIG. 26B shows a case in which the printed product 2601 is captured from a position lower than in FIG. 26A. Since captured from the lower side, the printed product 2601 looks deformed as indicated by 2606 on the display 2603. At this time, each frame of the moving image, which is deformed to the same shape and size and adjusted to the same direction, is combined and reproduced in the moving image reproduction region 2606. Hence, if the position of the smartphone or printed product is changed, the moving image reproduction region 2606 changes accordingly, and the user feels as if the image on the printed product moved.

Note that if the processing from step S2905 to S2908 delays during the time until reproduction of the succeeding frame, several frames may be skipped, and the reproduction may be performed while leaving an interval. This enables implementation of the experience even in a camera-equipped portable terminal of low performance.

In this embodiment, the feature amount of an image is embedded in a printed product itself. Hence, when capturing the printed product of an image, a similar image hardly causes an operation error.

In this embodiment, information capable of extracting the feature amount of an image is embedded in a printed product as multiplexed information. Hence, an application need not hold the feature amount of the image in advance. For this reason, not a dedicated application for a small number of images but a print application and a reading application that can generally be used for an indefinite number of images can be provided. In addition, since a content to be reproduced is determined by reading multiplexed information, the user need not be made to select what kind of feature amount should be used. Hence, the operability improves.

A description has been made above assuming that an image is captured such that the printed product 112 is included in the display 109. However, the printed product 112 may have a size that does not fit in the display 109, as shown in FIG. 24.

Figure 25:
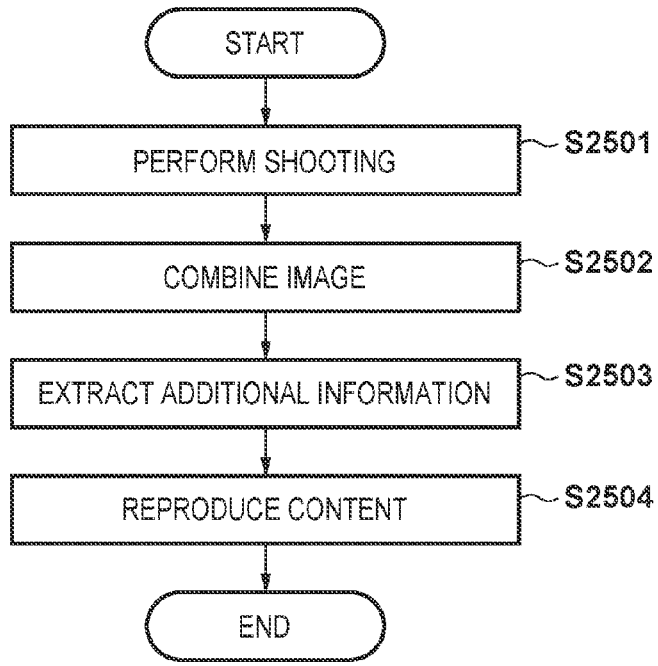
FIG. 25 is a flowchart showing processing in the case of FIG. 24.

FIG. 25 is a flowchart showing processing in a case in which the printed product 112 has a size that does not fit in the display 109. The processing shown in FIG. 25 is implemented when, for example, the CPU 3310 of the camera-equipped portable terminal 104 loads a program stored in the ROM 3311 to the RAM 3312 and executes it.

Figure 24:
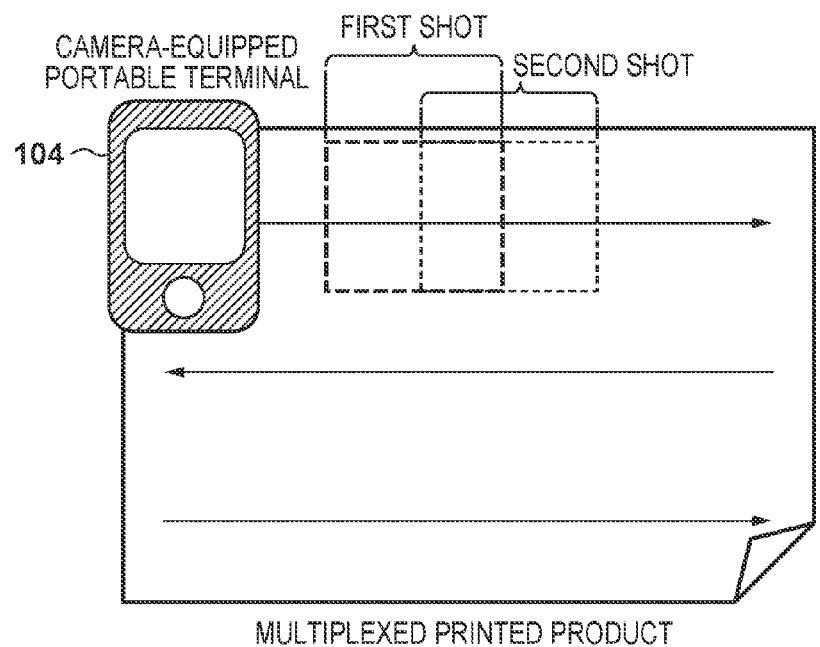
FIG. 24 is a view showing a case in which a printed product is continuously shot.

In step S2501, the user repeats shooting a plurality of times while moving the camera-equipped portable terminal 104 on the printed product 112 in a predetermined direction such that videos overlap between the shots, as shown in FIG. 24. The user further repeats the above operation a plurality of times in a direction perpendicular to the predetermined direction. As a result, the reading application acquires a plurality of images that constitute the printed product 112.

In step S2502, the reading application combines the camera-equipped portable terminal images acquired in step S2501 and executes reduction processing according to the display region of the display 109. The combining is done based on the images of the overlapping portions between the plurality of shots. In step S2503, the same additional information extraction as in step S2903 is performed. In step S2504, the same moving image (content) reproduction as in steps S2904 to S2908 is performed.

[Embedding Processing of Additional Information]

Processing of embedding additional information as multiplexed information in a printed product will be described next. Note that the following is a mere example of this embodiment, and a method of embedding information is not limited to a method to be described below. Printing will be explained, but the present invention is not limited to this. The same effect can be obtained by an arrangement that, for example, embeds multiplexed information in RGB image data and displays it on a display 114.

FIG. 2 is a block diagram showing the arrangement of the additional information multiplexing unit 102 shown in FIG. 21A. FIG. 2 has already been described in the first embodiment and a description thereof will be omitted. Details of an error diffusion unit 200 shown in FIG. 3, a printed product creation procedure shown in FIG. 4, a digital watermark superimposition region shown in FIG. 5, a change of a quantization threshold shown in FIGS. 6A and 6B, a tilt of an image shown in FIG. 8, spatial filters shown in FIGS. 9A and 9B, a frequency domain shown in FIG. 10, a digital watermark decoding procedure shown in FIG. 11, and an example of a pixel specifying method shown in FIG. 12 are the same as in the first embodiment, and a description thereof will be omitted except different points.

[Reading Processing of Additional Information]

The processing of the additional information demultiplexing unit 106 in the image processing system shown in FIG. 21B will be described next. FIG. 22 is a block diagram showing the arrangement of the additional information demultiplexing unit 106. Unlike FIG. 7, the pixel specifying units 706 and 707 are replaced with sampling units 2201 and 2202, respectively. Hence, only the different points will be explained. The rest of the arrangement is the same as that described with reference to FIG. 7.

The sampling units 2201 and 2202 perform processing of sampling, based on certain regularity, a signal (to be referred to as a converted value hereinafter) after filtering in a block of P×Q pixels. In this embodiment, sampling processing is performed by dividing the regularity into a periodicity and a phase. That is, the pixel specifying units 2201 and 2202 perform sampling in different periodicities, and execute a plurality of sampling processes while changing the phase. The sampling method will be described later.

Converted value addition units 708 add the converted values sampled by the sampling units 2201 and 2202 for each phase. The sampling processing and the addition processing of the converted values of the sampled pixels correspond to extracting power of a predetermined frequency vector enhanced by spatial filters.

Figure 23:
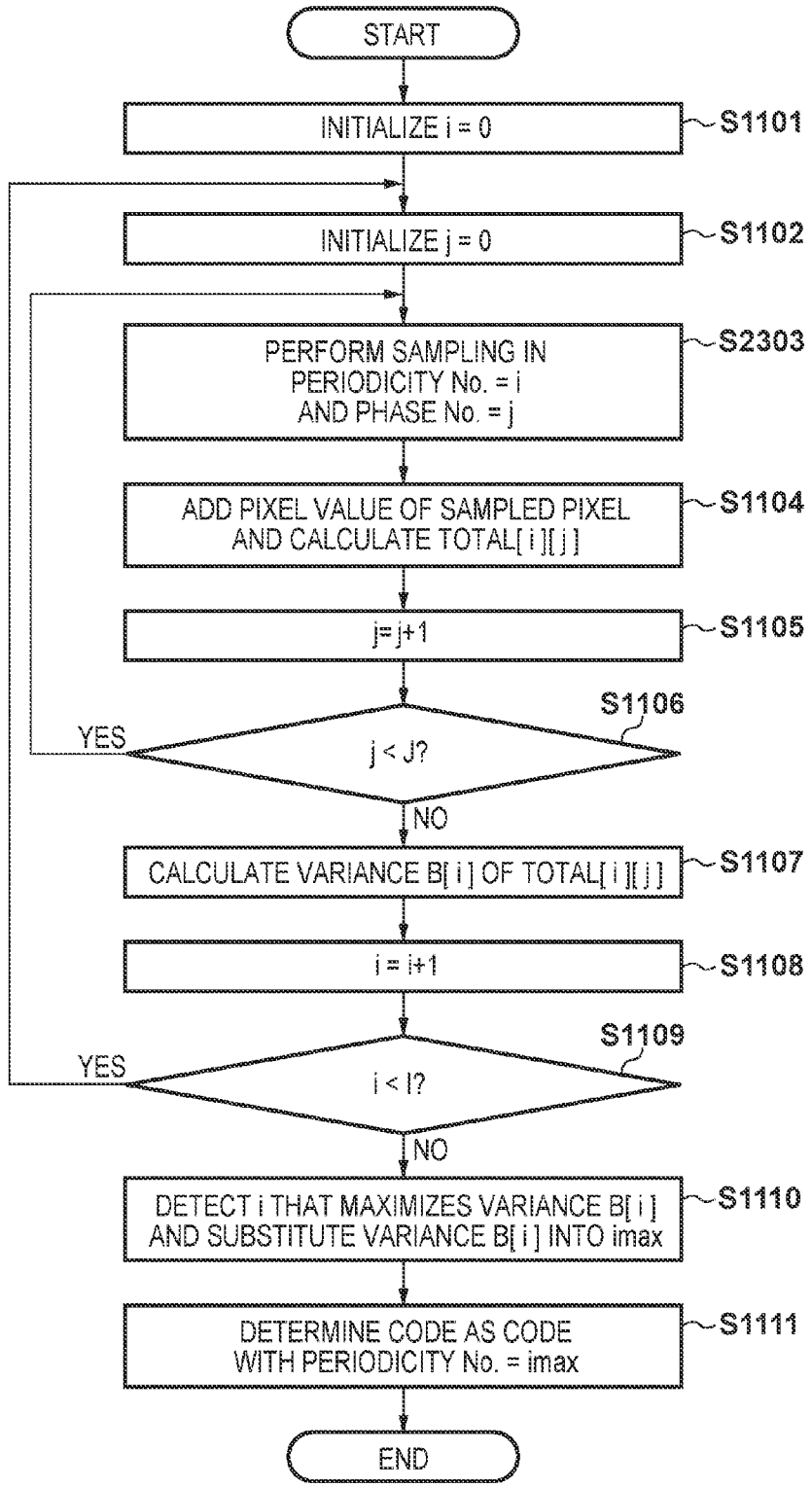
FIG. 23 is a flowchart showing processing from a sampling unit to a determination unit.

FIG. 23 is a flowchart showing the processing of the sampling units 2201 and 2202, the converted value addition units 708, a variance calculation units 709, and a determination unit 710 shown in FIG. 22. The processing shown in FIG. 23 is implemented when, for example, the CPU 3310 of the camera-equipped portable terminal 104 loads a program stored in the ROM 3311 to the RAM 3312 and executes it. Note that the same step numbers as in FIG. 11 denote the same steps in FIG. 23. However, some steps are different from FIG. 11 in detailed points, and whole processing will be described.

In FIG. 22, in steps S1101 and S1102, variables are initialized. The CPU 3310 initializes the values of variables i and j allocated in the RAM 3312 to 0.

In Step S2303, the CPU 3310 determines the factors of the regularity of sampling by the sampling units 2201 and 2202, that is, two factors "periodicity" and "phase". In this flowchart, let i be the variable concerning the periodicity, and j be the variable concerning the phase. The conditions of the phase and periodicity are managed by numbers. The factors of a sampling method in which a periodicity number (to be abbreviated as No. hereinafter) is i, and a phase No. is j are set.

In step S1104, the CPU 3310 adds a converted value sampled in a block. The added value is stored as a variable array TOTAL[i][j].

In step S1105, the CPU 3310 increments the variable j. In step S1106, the variable j is compared with a fixed value J. J stores the number of times of performing the sampling processing while changing the phase. If the variable j is smaller than J, the process returns to step S2303 to repeat the sampling processing and the addition processing of the converted value of a sampled pixel based on the new phase No. according to the incremented variable j.

When the sampling processing and the addition processing of the converted value of the sampled pixel are performed based on the shifted phase the set number of times, in step S1107, the CPU 3310 calculates a variance of the addition result TOTAL[i][j]. That is, the degree of variation of each addition result caused by a phase difference is evaluated. Here, i is fixed, and the variances of J results TOTAL[i][j] are obtained. The variance is B[i].

In step S1108, the CPU 3310 increments the variable i. In step S1109, the variable i is compared with the fixed value I. I stores the number of times of performing sampling processing while changing the periodicity. If the variable i is smaller than I, the process returns to step S1102 to repeat the sampling processing and the addition processing of the converted value of a sampled pixel using a new periodicity No. condition according to the incremented variable i.

If the CPU 3310 determines in step S1109 that i reaches the set count I, I variances B[i] can be calculated. In step S1110, the maximum value of the variance is detected from the set of I variances, and the value i at this time is substituted into a variable imax. In step S1111, the CPU 3310 determines a code whose periodicity No. is imax as a multiplexed code. After that, the processing shown in FIG. 22 ends.

A sampling method in a case in which the block size is defined by P=Q=16 will be described using FIGS. 12 and 13 of the first embodiment.

In this embodiment, FIG. 12 shows a sampling method (corresponding to the sampling unit A 2201 in FIG. 22) in periodicity No.=0. In this embodiment, FIG. 13 shows a sampling method (corresponding to the sampling unit B 2202 in FIG. 22) in periodicity No.=1. In FIGS. 12 and 13, a value added to each pixel in the blocks indicates a sampled pixel for the phase No. j. For example, a pixel indicated by "0" corresponds to a sampled pixel when j=0. That is, there are four types of phases in both FIGS. 12 and 13 which correspond to sampling methods in a case in which the phase No. j is 0 to 3.

The periodicity shown in FIG. 12 matches the periodicity in FIG. 6A, and the periodicity shown in FIG. 13 matches the periodicity in FIG. 6B. As described above, in both FIGS. 6A and 6B, quantized values "1" (in binary expression using "0" and "1") readily line up in the arrangement of hatched squares. For this reason, in a block for which, for example, the quantization condition A is set upon multiplexing, the quantized values "1" easily line up at the periodicity shown in FIG. 6A. When filtering is performed by applying an adapted spatial filter, the frequency component is further amplified. If converted value sampling processing and addition processing of the converted value of a sampled pixel are performed based on the periodicity shown in FIG. 12, the variance of the addition result becomes large.

In contrast, if filtering using an inadequate spatial filter is performed for the block for which the quantization condition A is set, and the sampling processing and the addition processing of the converted value of the sampled pixel are performed based on the periodicity shown in FIG. 13, the variance of the addition result of converted values becomes small. This is because the periodicity of the quantized values and the periodicity of sampling are different, and therefore, the added value of converted values by the phase difference of sampling is average, and the variation is small. Similarly, if the sampling processing of the converted value and the addition processing of the converted value of the sampled pixel are performed, based on the periodicity shown in FIG. 12, for the block for which the quantization condition B is set, the variance of the addition result becomes small. On the other hand, if, in that case, the sampling processing of the converted value and the addition processing of the converted value of the sampled pixel are performed based on the periodicity shown in FIG. 13, the variance of the addition result becomes large.

As described with reference to FIG. 4, bit=0 is set to the quantization condition A, and bit=1 is set to the quantization condition B. For this reason, if the variance of the periodicity No.=0 is large, it can be determined that bit=0. If the variance of the periodicity No.=1 is large, it can be determined that bit=1.

As described above, by associating the quantization condition, the spatial filter characteristic, and the periodicity of the sampling condition, multiplexing and demultiplexing can easily be implemented. In this embodiment, two types of periodicities "0" and "1" are used, and a multiplexed code in a block is a 1-bit code. However, the number of bits of a multiplexed code may be larger than 1 bit. Needless to say, the type of the quantization condition, the type of the spatial filter, and the type of the periodicity No. (value I) of the sampling condition match each other.

According to this embodiment, a multiplexed code can easily be demultiplexed without comparing the power of a frequency corresponding to the regularity of a quantization condition by orthogonal transformation. In addition, since the processing is performed in the real space domain, demultiplexing processing can be implemented very fast.

This embodiment has been described above. The quantization conditions A and B, the spatial filters A and B, and the sampling units A and B are merely examples, and are not limited to those described above. The processing may be performed for another periodicity, and the number of taps of the spatial filter, the block size of sampling, and the like may be larger or smaller than in the example of this embodiment.

For the descriptive convenience, the processing shown in FIG. 23 has been described as iterative processing of the variable i that is the periodicity No. and the variable j that is the phase No. However, it may be implemented by iterative processing using a pixel address in a block of P×Q pixels. That is, two kinds of information, that is, the periodicity No. and the phase No. are stored in advance as tables in correspondence with each pixel address in a block, as shown in FIGS. 12 and 13, and converted values are added for each of the variables of the corresponding periodicity No. and phase No. With this method, the added values of the sets of periodicity Nos. and phase Nos. can be calculated in parallel only by processing P×Q pixels.

In the processing shown in FIG. 23, the variances of the addition results of the converted values of sampled pixels after filtering by the spatial filters are calculated, and the variances are compared to determine a code. However, the method is not limited to this. A code may be determined by comparing evaluation functions without using variances. If the addition results of sampled converted values localize, the values are readily noticeable only for one phase when the phase is shifted. Hence, evaluating the "degree of variation" suffices.

For example, to evaluate the degree of variation, for example, the following evaluation functions may be used in addition to variances.

1. The difference between the maximum value and the minimum value of values obtained by adding sampled converted values 2. The difference between the maximum value and the second largest value of values obtained by adding sampled converted values or the difference between the minimum value and the second smallest value 3. The maximum value of the differences between consecutive values in a histogram created by values obtained by adding sampled converted values The three evaluation functions represent absolute difference values. The relative ratio of one of the difference values to a converted value, a pixel value, or the sum of converted values may be used as an evaluation function. A binary quantized value has been described above as an example. However, the quantized value is not limited to this.

As described above, according to this embodiment, the quantization condition is changed for each block formed from M×N pixels, and an image is quantized in accordance with the quantization condition, thereby embedding predetermined additional information in the image. Hence, as compared to, for example, a method of embedding information by orthogonal transformation, additional information can be embedded in an image such that degradation in image quality can be suppressed, and the embedded additional information can accurately be extracted at a high speed.

In addition, according to this embodiment, since multiplexed information (additional information) is invisibly embedded, as described above, and the information is captured and read, a code part need not be arranged on a printed product. It is therefore possible to avoid an arrangement of a code part that is considered to be unnecessary from the viewpoint of enjoying a photograph. Furthermore, the user can save time to implement two actions of capturing a code part on a printed product and then capturing a photograph part, or performing a user operation to determine which feature amount should be used and then capturing a photograph part. In this embodiment, the processing can be executed by one action of capturing only a photograph part on a printed product. It is therefore possible to reduce the labor of the user and improve convenience.

Fifth Embodiment

Figure 30:
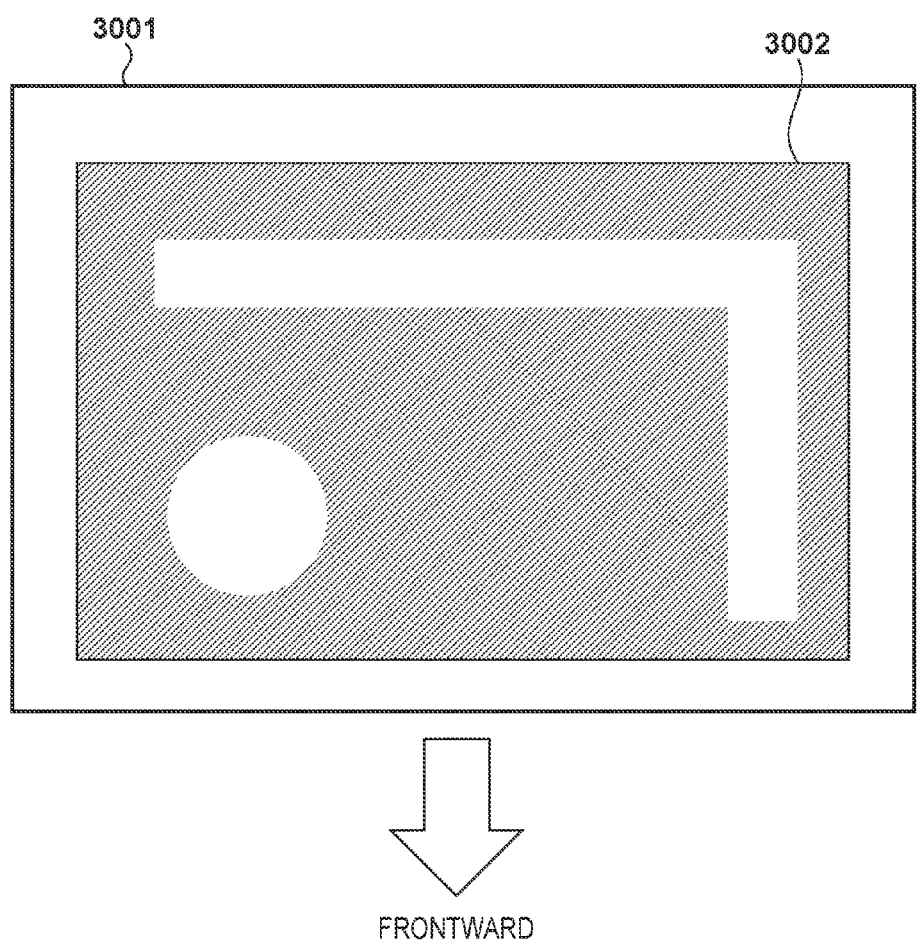
FIG. 30 is a view showing a printed product.

As for this embodiment, only points different from the fourth embodiment will be described below. FIG. 30 is a view showing a printed product 112 output by a print application in this embodiment. A code part 3002 is printed on a paper sheet 3001. In the fourth embodiment, a photograph cut out from a moving image is printed. In this embodiment, however, only a code is printed. Multiplexed information is embedded in the code part 3002, as will be described later. The code part 3002 is preferably a pattern image that generates a unique feature at the time of feature amount creation. In addition, the code part 3002 is a pattern image whose direction, size, and position can be grasped at the time of matching using a feature amount even if tilt or rotation occurs upon capturing.

FIG. 31 is a flowchart showing generation processing of a printed product on which information is multiplexed. The processing shown in FIG. 31 is implemented when, for example, a CPU 211 of an image processing apparatus 115 loads a program stored in a ROM 212 to a RAM 213 and executes it.

In step S3101, a print application is activated in accordance with a user instruction on a terminal such as a PC or a smartphone, as in step S2801.

In step S3102, a 3D object is selected. The 3D object is an object displayed by the AR technology and includes various contents such as furniture, house, automobile, clothes, person, animal, character, and food. The user selects a content provided in the print application in advance or selects, using a network, a content held by a server. Instead of selecting, the user may load and acquire a 3D object created by himself/herself. The 3D object has information used to reproduce the 3D object, such as coordinates, colors, and a light source, in a known format, for example, Wavefront OBJ®, LWS®, 3DS®, or VRML®. When a preview of 3D objects or a list of captions is displayed on a display, the user selects an arbitrary object using an input device such as a pointing device or a keyboard or by a touch operation.

In step S3103, the print application acquires a code. The code is two-dimensional image information like the code part 3002 shown in FIG. 30. The print application may hold a plurality of code patterns and select one of them. The code part 3002 may dynamically be created in the print application or downloaded from a server via a network. A code created by the user may be loaded and acquired. The code part 3002 may be a barcode or a drawn logotype or character, and may be monochrome or color. As described above, the code part 3002 is a pattern image that generates a unique feature at the time of feature amount creation. In addition, the code part 3002 is a pattern image whose direction, size, and position can be grasped at the time of matching using a feature amount even if tilt or rotation occurs upon capturing.

In step S3104, the print application creates a feature amount. Feature amount creation is performed for the code acquired in step S3103, as in step S2806 of the fourth embodiment. Note that if the feature amount of the code is held by another application or a server, the feature amount of the code is held by the application or server may be used, instead of creating the feature amount. An image of the code may be sent to a server, and a feature amount may be created in the server and downloaded by the print application. However, the feature amount of the code needs to be acquired by the same method as a feature amount creation method used by a reading application to be described later.

In step S3105, the print application acquires additional information. In this embodiment, the additional information includes the feature amount information created in step S3104 and the 3D object information selected in step S3102. As in step S2807 of the first embodiment, the additional information is input to an additional information multiplexing unit 102 via an input terminal 101 shown in FIG. 1.

In step S3106, the print application performs additional information multiplexing. As in step S2808 of the first embodiment, the additional information multiplexing unit 102 shown in FIG. 1 creates a multiplexed image using the additional information and the image information of the code part 3002.

In step S3107, the print application performs printing. As in step S2808 of the first embodiment, the multiplexed image is sent to a print unit 103 and printed. As a result, a printed product 112 created by printing the code part 3002 with multiplexed information on the paper sheet 3001 is output.

FIG. 30 shows the printed product 112 according to this embodiment. The code part 3002 is printed on the paper sheet 3001 to represent the pattern of the code. Information is multiplexed on the code part 3002, and a multiplexed signal is embedded. FIG. 30 shows the printed product in two colors, white and black. In fact, since the multiplexed signal is embedded by the method as described in the first embodiment, multiple colors are used. Note that the method of embedding the multiplexed signal in the white or black part is the same as that described in the first embodiment, and a description thereof will be omitted.

FIG. 32 is a flowchart showing the processing of a reading application that reads the printed product 112 with the multiplexed information, which is output in step S3107. The processing shown in FIG. 32 is implemented when, for example, a CPU 3310 of a camera-equipped portable terminal 104 loads a program stored in a ROM 3311 to a RAM 3312 and executes it.

In step S3201, an information multiplexing reading application (to be referred to as a reading application hereinafter) is activated in accordance with a user instruction on a device equipped with a camera, such as a PC or a smartphone, or a device to which a camera is connected.

In step S3202, capturing by a camera is performed. As in step S2902 of the first embodiment, the reading application displays, on a display 109, a video captured by the camera function of the device. The user captures the printed product 112 while confirming, on the display 109, the portion that the camera is capturing. During this time, an imaging sensor 105 continuously acquires a captured image at a rate of, for example, 30 times per sec. The capturing operation is continued up to the end of the reading processing. The image acquired here is a 24-bit image formed from 8-bit R, G, and B components.

In step S3203, the reading application extracts the multiplexed additional information. An additional information demultiplexing unit 106 demultiplexes the additional information from an image acquired from the imaging sensor 105 in step S3202, thereby extracting the additional information. The additional information includes the feature amount information and the 3D object information input to the input terminal 101 in step S3105 and multiplexed in step S3106. Capturing by the camera in step S3202 and additional information extraction in step S3203 are repetitively performed. When the additional information extraction is completed, the reading application notifies the user of the success of reading by display on the display 109 or sound generation from a speaker 108.

In step S3204, the reading application makes 3D model reproduction preparation. The reproduction preparation means preparing an environment to display a 3D model as a three-dimensional object. The reading application prepares a 3D reproduction program created using, for example, CUDA®, OpenGL®, or OpenGL ES® to attain a state capable of acquiring 3D object data. Settings of memory allocation, expansion of the 3D reproduction program, expansion of the program to the GPU, and the like are done based on the 3D object information extracted in step S3203. Coordinates, angle, distance, size, and the like are thus input to the API for 3D reproduction so that the 3D object can be displayed at an arbitrary point of the display 109.

In step S3205, the reading application calculates the feature amount of the image. The reading application sequentially acquires an RGB image by the capturing of the camera which is repetitively performed from step S3202. The reading application executes the same processing as the feature amount creation in step S3104 for the RGB image, and creates the feature amount of the RGB image.

In step S3206, the reading application compares feature amounts. The reading application compares the feature amount information extracted in step S3203 with the feature amount of the captured image created in step S3205, and determines whether the target image, that is, the code part 3002 printed on the printed product exists in the captured image. Upon determining that the target image printed by the print unit 103 exists in the captured image, a coordinate position, angle, and size of the determined image are acquired. On the other hand, upon determining that the target printed product does not exist in the captured image, the processing of the reading application returns to step S3205 to newly acquire an RGB image and create the feature amount of the RGB image. Upon determining that the target image exists in the captured image, the process advances to step S3207. In step S3206, another value such as a distance may be calculated from size information.

In step S3207, the reading application performs image combining. Based on the coordinate position, angle, and size acquired in step S3206, the 3D object is combined with the image obtained by starting capturing in step S3202, using the 3D reproduction environment prepared in step S3204. Note that the combining is performed by overwriting (combining) the 3D object on a VRAM (not shown) for performing display on the display using the function of the GPU. Note that the combining processing may be implemented by a method of, for example, performing the processing on the memory using the CPU and rendering the image on the VRAM. The 3D object is displayed such that the 3D object is placed on the code part 3002 shown in FIG. 30, and the front part of the 3D object is directed to the front side of the code part 3002. As a result, on the display 109, the 3D object is displayed on the video captured by the camera.

In step S3208, the reading application determines whether a user operation to end the display of the 3D object is performed. For example, it is determined whether the home button of the device or the escape button of the keyboard is pressed by a user operation. Alternatively, it is determined whether a user interface (UI) is displayed on the display 109, and the end button of the UI is clicked. Upon determining that the user operation to end is performed, the imaging operation started from step S3202 ends, and the process advances to end processing of the reading application. On the other hand, upon determining that the user operation to end is not performed, the process returns to step S3205.

Figure 34A:
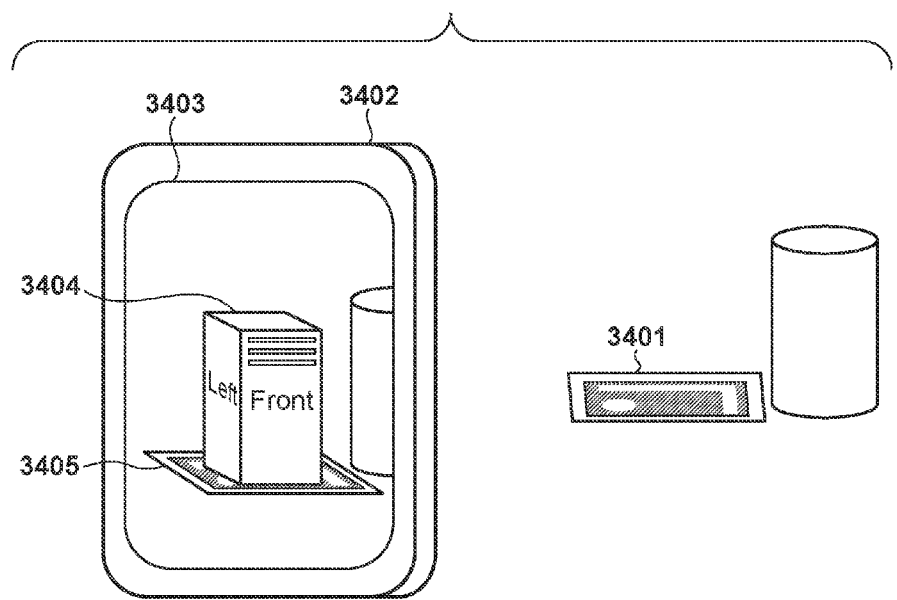
FIG. 34A is a view showing an execution result of 3D object processing.
Figure 34B:
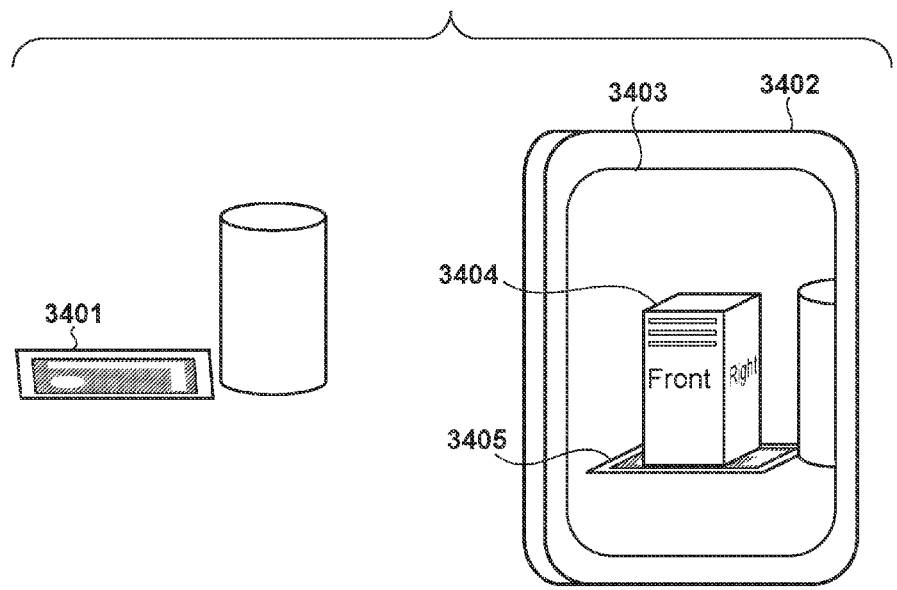
FIG. 34B is a view showing an execution result of 3D object processing.

FIGS. 34A and 34B are views showing the execution result. FIG. 34A shows an example in which the printed product 3001 is placed on the floor and captured slightly from the left side using the camera function of a smartphone 3402. When the printed product 3001 with the printed code is placed, it looks like a printed product 3401. When an image including the printed product 3401 is captured slightly from the left side by the smartphone 3402, the printed product 3401 is displayed like a printed product 3405 on a display 3403. Based on the position, size, and angle of the printed product 3405, a 3D object 3404 is displayed in a position, size, and angle as shown in FIG. 34A. For example, when the 3D object is furniture, its size, tone, and the like in a room can be simulated. As a result of capturing the printed product slightly from the left side, the left surface of the 3D object is visible.

FIG. 34B shows an example in which the printed product 3401 placed on the floor as described above with reference to FIG. 34A is captured slightly from the right side. As described above, the 3D object 3404 is displayed on the display 3403 in a position, size, and angle shown in FIG. 34B on the printed product 3405. As a result of capturing the printed product slightly from the right side, the right surface of the 3D object is visible.

For the descriptive convenience, the 3D object is smaller than the printed product 3405. However, the present invention is not limited to this. The method can be implemented even if the 3D object is larger than the printed product 3405 on which the matching target image is printed and hides the printed product 3405 on the display.

As described above, when a 3D object is displayed on a video captured by the camera, and the direction, angle, and distance of the camera are changed with respect to the printed product, the 3D object is accordingly displayed in a changed direction, angle, and size. As a result, when the user views the display 109, he/she can view a video as if the 3D object existed there.

Figure 35:
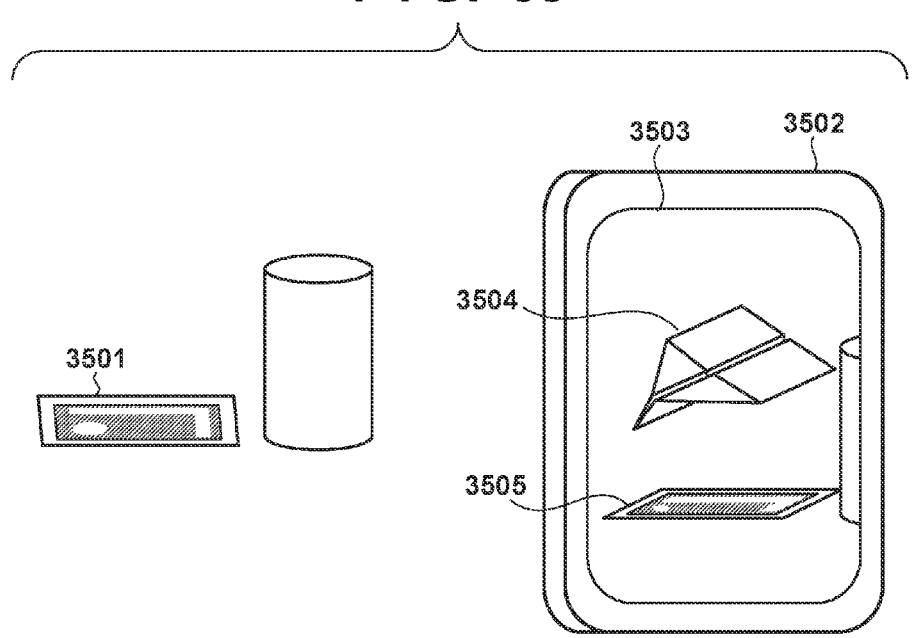
FIG. 35 is a view showing a state in which another 3D object is displayed.

FIG. 35 shows an example in which another 3D object is displayed. A printed product 3501 is a printed product in which multiplexed information is embedded, like the printed product 3401 shown in FIGS. 34A and 34B. On a display 3503, the printed product 3501 is displayed like a printed product object 3505, and a 3D object 3504 suspended immediately above is displayed. This is implemented by determining as a result of matching that the printed product object 3505 is the target image region, and based on the position, size, and angle of the image, combining the 3D object 3504 in a position, size, and angle with which the 3D object looks suspended. The position at which the 3D object looks suspended is determined in advance to, for example, a distance N % the size of the printed product object 3505.

In addition to displaying the 3D object in the target image region, the position of the object may be decided based on the target image region. The 3D object may be moved or deformed. In moving, when the 3D object moves based on the position of the target image region, the user can easily recognize the augmented reality.

In this embodiment, a feature amount and 3D object data, which are information necessary for AR, are embedded in a printed product itself. For this reason, the processing of AR can be performed even under an environment where a network cannot be used. Even under such an environment, the processing can be implemented not by a dedicated application for a small number of contents but by a reading application capable of generally using an indefinite number of contents. Additionally, since one portion of the target printed product is captured, the labor of the user in the capturing can be reduced.

In the fourth embodiment, an image cut out from a moving image is printed, and moving image reproduction is the effect of AR. However, the present invention is not limited to this. A still image related to the moving image may be used as a printing target, or conversely, a moving image related to an image may be reproduced. A still image and a moving image may be irrelevant.

In the fifth embodiment, a 3D object is made to appear on the display 109. An application can also be considered. For example, using a communication function such as a network, the 3D object caused to appear on the display 109 may be used as a screen to display a moving image of a TV or the like, or a TV phone may be implemented. When the 3D object is a screen, another application such as a web browser or a game can be displayed on it. The 3D object is not limited to an object at rest, and an effect such as a motion, deformation, or color change may be added. For example, a 3D avatar may be displayed, and communication such as a conference may be done.

In the first and second embodiments, the feature amount of an image is embedded as additional information at the time of multiplexing. However, the present invention is not limited to this. For example, the feature amount may be uploaded to a dedicated server, and a URL that allows the feature amount to be downloaded may be embedded as additional information in a printed product by multiplexing. That is, the URL is information used to acquire the feature amount and is embedded to be invisible. This makes it possible to use a feature amount of a larger capacity.

The AR effect image processing is performed not only in moving image reproduction or 3D object appearance but also for an audio such as a message or music. These connects may be located on a network, or if the data amount falls within the embedding capacity, embedded as multiplexed information in a printed product. This obviates the necessity of performing communication with a network or the like.

If a content is stored in the storage of a device on which a reading application operates, an instruction to make the reading application operate may be embedded as multiplexed information, and the reading application may execute the instruction. For example, a moving image in a smartphone may be designated and reproduced as in the first embodiment. This obviates the necessity of performing communication with a network or the like, and enables reproduction of a content equal to or more than the capacity that can be embedded as multiplexed information in a printed product.

A method of reproducing these contents may be embedded as multiplexed information. The information represents, for example, whether to do moving image reproduction described in the first embodiment or 3D object reproduction described in the second embodiment. Conventionally, these processes are distributed as dedicated applications. However, with the above-described arrangement, various contents can be reproduced by one general-purpose application, and the user need not download a number of applications. Hence, the storage capacity of a device such as a smartphone is hardly strained. In addition, the user can save time to switch an application depending on a content.

In the fourth and fifth embodiments, a video captured by a camera is displayed on the display in real time, and a moving image or a 3D object is combined. However, the present invention is not limited to this. A still image including a reading target image may be shot, and a moving image or a 3D object is combined with the still image and displayed on the display. This obviates the necessity of combining an image with a real-time video shot by a camera. Hence, processing such as the camera function, feature amount creation, and feature amount matching can be omitted when executing AR, and even a low-performance terminal can execute the processing.

Note that the extension of the present invention according to the fourth and fifth embodiments can be summarized as follows.

(1) According to the first aspect of the present invention, an information processing apparatus includes: an imaging unit configured to capture an image on which additional information is multiplexed, thereby obtaining captured image data including the image; an acquisition configured to acquire the multiplexed additional information from the captured image data obtained by the imaging unit; a data acquisition unit configured to acquire, based on the additional information acquired by the acquisition unit, image data used to give a special effect to the captured image data; a combining unit configured to combine the image data acquired by the data acquisition unit with the captured image data based on the additional information acquired by the acquisition unit, thereby giving the special effect to the captured image data.

(2) According to the second aspect, the additional information includes identification information used to identify moving image data to give a moving image effect based on a position of the image included in the captured image data, the data acquisition unit acquires the moving image data identified by the identification information, and the combining unit combines the moving image data acquired by the data acquisition unit with the captured image data, thereby giving the moving image effect to the captured image data.

(3) According to the third aspect, the image that is an imaging target of the imaging unit on which the additional information is multiplexed is a still image extracted from the moving image data.

(4) According to the fourth aspect, the additional information includes information used to acquire 3D object data to give a 3D effect to the image included in the captured image data, the data acquisition unit acquires the 3D object data based on the information, and the combining unit combines the 3D object data acquired by the data acquisition unit with the captured image data, thereby giving the 3D effect to the captured image data.

(5) According to the fifth aspect, the apparatus further includes a specifying unit configured to specify a region of the image in the captured image data obtained by the imaging unit, and the combining unit combines the image data acquired by the data acquisition unit with the captured image data based on the region of the image specified by the specifying unit.

(6) According to the sixth aspect, the additional information includes a feature amount of the image that is the imaging target of the imaging unit on which the additional information is multiplexed, and the specifying unit specifies, based on the feature amount, the region of the image in the captured image data obtained by the imaging unit.

(7) According to the seventh aspect, the additional information is multiplexed, by an error diffusion method, on the image that is the imaging target of the imaging unit on which the additional information is multiplexed, and the acquisition unit applies a plurality of types of spatial filters to the captured image data obtained by the imaging unit, specifies a quantization condition to multiply the additional information from each application result, and acquires the additional information based on a value corresponding to the specified quantization condition.

(8) According to the eighth aspect, the acquisition unit specifies the quantization condition to multiply the additional information for each block of the captured image data obtained by the imaging unit, and acquires the additional information based on the value corresponding to the specified quantization condition.

(9) According to the ninth aspect, the image that is the imaging target of the imaging unit is a printed product, and an imaging resolution of the imaging unit is equal to or more than a print resolution of the printed product.

(10) According to the tenth aspect, the information processing apparatus is a portable terminal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-198928, filed Oct. 6, 2015, Application No. 2015-198929, filed Oct. 6, 2015 which are hereby incorporated by reference herein in their entirety.

What is claimed is:

1. An image processing method, performed by a processor executing a program stored in a memory, of acquiring additional information from image information obtained by shooting a printed product on which the additional information is multiplexed by at least one of a plurality of different multiplexing methods, comprising:
   attempting decoding of the additional information from the image information by a plurality of different decoding methods corresponding to the plurality of different multiplexing methods; and
   outputting the additional information successfully decoded,
   wherein the additional information is multiplexed for each block formed by dividing the image information, and
   in the attempting decoding, the decoding of the additional information is attempted for each block by each of the plurality of different decoding methods, and a rest of the image information is decoded by the decoding method that has succeeded in the decoding.

2. The method according to claim 1, wherein in the attempting decoding, the decoding of the additional information from the image information is attempted by performing the plurality of different decoding methods in parallel.

3. The method according to claim 1, wherein in the attempting decoding, the decoding of the additional information from the image information is attempted by performing the plurality of different decoding methods while performing switching.

4. The method according to claim 1, wherein the additional information is invisible information.

5. The method according to claim 1, wherein in the additional information, visible information and invisible information coexist.

6. The method according to claim 5, wherein in the attempting decoding in an image in which the visible information and the invisible information coexist, additional information acquired from the visible information and additional information acquired from the invisible information are collated to determine matching.

7. The method according to claim 1, further comprising shooting the printed product to obtain the image information.

8. The method according to claim 1, wherein the outputting includes reproducing the additional information.

9. The method according to claim 1, wherein each of the plurality of different multiplexing methods is a multiplexing method of, for each block formed by dividing the image information, quantizing the block using a quantization threshold matrix corresponding to a code of the additional information, thereby multiplexing the additional information, and
   a first quantizing condition for a first multiplexing method out of the plurality of different multiplexing methods and a second quantizing condition for a second multiplexing method out of the plurality of different multiplexing methods are different.

10. An image processing method, performed by a processor executing a program stored in a memory, of acquiring additional information from image information obtained by shooting a printed product on which the additional information is multiplexed by a multiplexing method, comprising:
   attempting decoding of the additional information from the image information by a plurality of different decoding methods; and
   outputting the additional information successfully decoded,
   wherein in the attempting decoding, the decoding of the additional information is attempted for the entire image information by each of the plurality of different decoding methods.

11. The method according to claim 10, wherein in the attempting decoding, the decoding of the additional information from the image information is attempted by performing the plurality of different decoding methods in parallel.

12. The method according to claim 10, wherein in the attempting decoding, the decoding of the additional information from the image information is attempted by performing the plurality of different decoding methods while performing switching.

13. The method according to claim 10, wherein the additional information is invisible information.

14. The method according to claim 10, wherein the additional information is multiplexed by at least one of a plurality of different multiplexing methods, and the plurality of different decoding methods corresponds to the plurality of different multiplexing methods.

15. An image processing method, performed by a processor executing a program stored in a memory, of acquiring additional information from image information obtained by shooting a printed product on which the additional information is multiplexed by at least one of a plurality of different multiplexing methods, comprising:
   attempting decoding of the additional information from the image information by a plurality of different decoding methods corresponding to the plurality of different multiplexing methods; and
   outputting the additional information successfully decoded,
   wherein in the attempting decoding, the decoding of the additional information is attempted for each region included in the image information by each of the plurality of different decoding methods.

16. The method according to claim 15, wherein in the attempting decoding, a region on which the additional information is multiplexed and a decoding method of the region are specified by the additional information decoded from a region included in the image information, and the additional information multiplexed on the specified region is decoded by the specified decoding method.

17. An image processing method, performed by a processor executing a program stored in a memory, of acquiring additional information from image information obtained by shooting a printed product on which the additional information is multiplexed by at least one of a plurality of different multiplexing methods, comprising:
   attempting decoding of the additional information from the image information by a plurality of different decoding methods corresponding to the plurality of different multiplexing methods; and
   outputting the additional information successfully decoded,
   wherein the plurality of different multiplexing methods includes, as one multiplexing method, a first multiplexing method of, for each block formed by dividing the image information, quantizing the block using a quantization threshold matrix corresponding to a code of the additional information, thereby multiplexing the additional information, and in the attempting decoding, a level of matching between a spatial frequency of the image information included in the block and a spatial frequency of a pattern of the quantization threshold matrix is determined, and if the level of matching is more than a predetermined value, the code corresponding to the quantization threshold matrix is decoded.

18. The method according to claim 17, wherein association between the code of the additional information and the quantization threshold matrix in the first multiplexing method is changed to obtain the plurality of different multiplexing methods.

19. The method according to claim 17, wherein the plurality of different multiplexing methods include the first multiplexing method and a multiplexing method different from the first multiplexing method.

20. An image processing apparatus for acquiring additional information from image information obtained by shooting a printed product on which the additional information is multiplexed by at least one of a plurality of different multiplexing methods, comprising:

a processor; and a memory which stores a program, wherein the processor, by executing the program stored in the memory, attempts decoding of the additional information from the image information by a plurality of different decoding methods corresponding to the plurality of different multiplexing methods, and the processor, by executing the program stored in the memory, outputs the additional information successfully decoded, and wherein the additional information is multiplexed for each block formed by dividing the image information, and in the attempting decoding, the processor attempts the decoding of the additional information for each block by each of the plurality of different decoding methods, and decodes a rest of the image information by the decoding method that has succeeded in the decoding.

* * * * *